United States Patent [19]
Brown et al.

[11] Patent Number: 5,941,947
[45] Date of Patent: Aug. 24, 1999

[54] SYSTEM AND METHOD FOR CONTROLLING ACCESS TO DATA ENTITIES IN A COMPUTER NETWORK

[75] Inventors: Ross M. Brown, Bellvue; Richard G. Greenberg, Redmond, both of Wash.

[73] Assignee: Microsoft Corporation, Redmond, Wash.

[21] Appl. No.: 08/516,573

[22] Filed: Aug. 18, 1995

[51] Int. Cl.$^6$ .................................................. G06F 17/00
[52] U.S. Cl. .................................................. 709/225
[58] Field of Search ............... 395/200.55, 200.56, 395/200.47, 200.48, 200.49, 186, 187.01, 188.01; 380/23, 24, 25; 709/225

[56] References Cited

U.S. PATENT DOCUMENTS

| | | | |
|---|---|---|---|
| 4,184,200 | 1/1980 | Wagner et al. | 395/188 |
| 4,280,176 | 7/1981 | Tan | 395/188 |
| 4,432,057 | 2/1984 | Daniell et al. | |
| 4,493,024 | 1/1985 | Baxter, II et al. | 395/188 |
| 4,799,153 | 1/1989 | Hann et al. | 380/25 |
| 4,799,156 | 1/1989 | Shavit et al. | |
| 4,800,488 | 1/1989 | Agrawal et al. | |
| 4,858,117 | 8/1989 | Dichiara et al. | 395/188 |
| 4,899,136 | 2/1990 | Beard et al. | |
| 4,914,571 | 4/1990 | Baratz et al. | |
| 5,079,765 | 1/1992 | Nakamura | |
| 5,113,499 | 5/1992 | Ankney et al. | 395/325 |
| 5,140,689 | 8/1992 | Kobayashi | |
| 5,151,989 | 9/1992 | Johnson et al. | |
| 5,187,790 | 2/1993 | Fast et al. | |
| 5,247,676 | 9/1993 | Ozur et al. | |
| 5,257,369 | 10/1993 | Skeen et al. | |
| 5,265,250 | 11/1993 | Andrade et al. | |
| 5,291,597 | 3/1994 | Shorter et al. | |
| 5,307,490 | 4/1994 | Davidson et al. | |
| 5,321,841 | 6/1994 | East et al. | |
| 5,329,619 | 7/1994 | Page et al. | |
| 5,341,477 | 8/1994 | Pitkin et al. | |
| 5,347,632 | 9/1994 | Filepp et al. | |
| 5,355,497 | 10/1994 | Cohen-Levy | |
| 5,367,621 | 11/1994 | Cohen et al. | |
| 5,371,852 | 12/1994 | Attanasio | |
| 5,388,255 | 2/1995 | Pytlik et al. | |
| 5,396,626 | 3/1995 | Nguyen | |

(List continued on next page.)

OTHER PUBLICATIONS

Operating System Concepts, Fourth Edition, Abraham Silberschatz and Peter B. Galvin, pp. 361–380, 431–457, ©1994.

Inside Windows NT, Helen Custer Foreword by David N. Cutler, The Object Manager and Object Security, Chapter Three, pp. 49–81. ©1993.

So . . . Just What is this First Class Thing Anyway? (visited Oct. 10, 1995) <http://orion.edmonds.wednet.edu/ESD/FC/AboutFC.html>.

Colton, Malcolm, "Replicated Data in a Distributed Environment," *IEEE* (1993).

(List continued on next page.)

*Primary Examiner*—Ellis B. Ramirez
*Attorney, Agent, or Firm*—Leydig, Voit & Mayer, Ltd.

[57] ABSTRACT

Access rights of users of a computer network with respect to data entities are specified by a relational database stored on one or more security servers. Application servers on the network that provide user access to the data entities generate queries to the relational database in order to obtain access rights lists of specific users. An access rights cache on each application server caches the access rights lists of the users that are connected to the respective application server, so that user access rights to specific data entities can rapidly be determined. Each user-specific access rights list includes a series of category identifiers plus a series of access rights values. The category identifiers specify categories of data entities to which the user has access, and the access rights values specify privilege levels of the users with respect to the corresponding data entity categories. The privilege levels are converted into specific access capabilities by application programs running on the application servers.

66 Claims, 10 Drawing Sheets

U.S. PATENT DOCUMENTS

| | | |
|---|---|---|
| 5,423,003 | 6/1995 | Berteau . |
| 5,434,994 | 7/1995 | Shaheen et al. . |
| 5,444,848 | 8/1995 | Johnson et al. . |
| 5,455,932 | 10/1995 | Major et al. . |
| 5,463,625 | 10/1995 | Yasrebi . |
| 5,473,599 | 12/1995 | Li et al. . |
| 5,475,819 | 12/1995 | Miller et al. . |
| 5,481,720 | 1/1996 | Loucks et al. . |
| 5,483,652 | 1/1996 | Sudama et al. . |
| 5,490,270 | 2/1996 | Devarakonda et al. . |
| 5,491,800 | 2/1996 | Goldsmith et al. . |
| 5,491,817 | 2/1996 | Gopal et al. . |
| 5,491,820 | 2/1996 | Belove et al. . |
| 5,497,463 | 3/1996 | Stein et al. . |
| 5,499,342 | 3/1996 | Kurihara et al. . |
| 5,500,929 | 3/1996 | Dickinson . |
| 5,513,314 | 4/1996 | Kadasamy et al. . |
| 5,526,491 | 6/1996 | Wei . |
| 5,530,852 | 6/1996 | Meske et al. . |
| 5,544,313 | 8/1996 | Shachanai et al. . |
| 5,544,327 | 8/1996 | Dan et al. . |
| 5,548,724 | 8/1996 | Akizawa et al. . |
| 5,548,726 | 8/1996 | Pettus . |
| 5,551,508 | 9/1996 | Pettus et al. . |
| 5,553,239 | 9/1996 | Heath et al. . |
| 5,553,242 | 9/1996 | Russell et al. . |
| 5,559,969 | 9/1996 | Jennings . |
| 5,564,043 | 10/1996 | Siefert . |
| 5,572,643 | 11/1996 | Judson . |
| 5,581,753 | 12/1996 | Terry et al. . |
| 5,592,611 | 1/1997 | Midgely et al. . |
| 5,596,579 | 1/1997 | Yasrebi . |
| 5,596,744 | 1/1997 | Dao . |
| 5,608,865 | 3/1997 | Midgely et al. . |
| 5,608,903 | 3/1997 | Prasad et al. . |
| 5,617,568 | 4/1997 | Ault et al. . |
| 5,617,570 | 4/1997 | Russell et al. . |
| 5,619,632 | 4/1997 | Lamping et al. . |
| 5,650,994 | 7/1997 | Daley . |
| 5,666,519 | 9/1997 | Hayden . |
| 5,675,723 | 10/1997 | Ekrot et al. . |
| 5,675,796 | 10/1997 | Hodges et al. . |
| 5,696,895 | 12/1997 | Hemphill . |
| 5,774,668 | 6/1998 | Choquire et al. . |

OTHER PUBLICATIONS

Coulouris et al., "Distributed Transactions," Chapter 14 of *Distributed Systems Concepts and Design $2^{nd}$ Ed.,* 409–421 (1994).

Cox, John, "Sybase Server to Add Complexity User for Challenge with Data Replication," *Communication* No. 483 (1993).

Eckerson, Wayne, "Users Give Green Light for Replication," *Network World* (Jul. 19, 1993).

Edelstein, Herb, "The Challenge of Replication," *DBMS* vol. 8, No. 4, 68 (Apr. 1995).

Edelstein, Herb, "Microsoft and Sybase are Adding their Unique Touches to SQI Servers," *Information Week*, No. 528, 62 (1995).

Edelstein, Herb, "Replicating Data," *DBMS* vol. 6, No. 6, 59 (Jun. 1993).

Gouhle, Michael, "RDBMS Server Choice Gets Tougher," *Network World*, 52 (May 23, 1994).

Heylighen, Francis, "World–Wide Web: A Distributed Hypermedia Paradigm for Global Networking," *Proceedings of the SHARE Europe Spring Conference*, 355–368 (1994).

International Telecommunications Union, *CCITT Blue Book vol. VIII Data Communication Networks Directory*, 3–18 (1989).

King, Adrian, "The User Interface and the Shell," *Inside Windows 95*, Chapter 5 (1994).

Pallatlo, John, "Sybase Lays Out Blue Print for Client/Server Networks," *PC Week*, vol. 9, No. 461, 6 (1992).

PR Newswire Association, Inc., "America On–line Publicly Previews World Wide Web Browser," *Financial News Section* (May 9, 1995).

Quereshi, "The Effect of Workload on the Performance and Availability of Voting Algorithms," *IEEE* (1995).

Rexford, Jennifer, "Window Consistent Replication for Real–Time Applications," *IEEE* (1994).

Richman, Dan, "Sybase to Enhance RDBMS," *Open System Today*, No. 111 (1992).

Terry, Douglas, "Session Guarantees for Weekly Consistent Replicated Data," *IEEE* (1994).

Wang, Yongdong, "Data Replication in a Distributed Heterogenous Database Environment," *IEEE* (1994).

300'

| | Token 1 | Token 2 | • • • | Token j |
|---|---|---|---|---|
| User 1 | XXXX | XXXX | | XXXX |
| User 2 | XXXX | XXXX | | XXXX |
| ⋮ | | | | |
| User N | XXXX | XXXX | | XXXX |

FIG. 4A

| Security Token | Name (Content Category) |
|---|---|
| 1 | Internal Public |
| 2 | Internal 18-and-Older |
| 3 | Internet Public |
| 4 | Internet 18-and-Older |
| ⋮ | ⋮ |
| 100 | Corporation X Beta Test Data |
| 101 | Family and Friends for Brown Family |
| | ⋮ |

FIG. 4B

| 300″ | Token 1 | Token 2 | ••• | Token j |
|---|---|---|---|---|
| Group 1 | XXXX | XXXX | | XXXX |
| Group 2 | XXXX | XXXX | | XXXX |
| ⋮ | | | | |
| Group X | XXXX | XXXX | | XXXX |
| User A | XXXX | XXXX | | XXXX |
| User B | XXXX | XXXX | | XXXX |
| ⋮ | | | | |

502 brackets Group 1 through Group X; 504 brackets User A, User B, ...

FIG. 5A

| Group ID | Group |
|---|---|
| 1 | Everyone |
| 2 | AllSysops |
| 3 | SuperSysops |
| 4 | Guest |
| 5 | Registration/Sign-Up |
| 6 | 18-and-Older Access |
| ⋮ | |

FIG. 5B

SYSTEM AND METHOD FOR CONTROLLING ACCESS TO DATA ENTITIES IN A COMPUTER NETWORK

FIELD OF THE INVENTION

The present invention relates to computer networks in which access rights to data entities vary from user-to-user. More particularly, the present invention relates to database systems for storing access rights information.

BACKGROUND

The present invention is directed generally to the problem of flexibly and efficiently controlling the access rights of a large number of users to a large number of objects or other data entities. The problem arises, for example, in the context of on-line services networks in which end users are given differing levels of access to different content entities. These content entities represent the services or "content" of the network, as seen by end users. The content entities may include, for example, bulletin board messages, mail messages, data files, folders, image files, sound files, multimedia files, executable files, on-line services, connections to other networks, etc. An on-line services network of this type is described in copending U.S. Application Ser. No. 08/472,807 having the title ARCHITECTURE FOR SCALABLE ON-LINE SERVICES NETWORK, filed Jun. 7, 1995 (Now U.S. Pat. No. 5,774,668).

The need to assign user-specific access rights to different content entities arises in a variety of situations. For example, it may be desirable to give some users access to certain "premium" services (such as specially-targeted investment newsletters), while limiting others users to some basic set of services. Further, it may be desirable to give certain users (such as system operators or administrators) the ability to modify, rename or delete certain content entities (such as bulletin board messages), while limiting other users to read-only access of such entities.

Various techniques are known in the art for controlling user accesses to objects and other data entities. One technique, which is commonly used in file systems, involves the storage of an access control list (ACL) for each data entity to which access is to be controlled. The ACL for a given data entity will typically be in the form of a list of the users that have access to the data entity, together with the access rights of each such user with respect to the data entity. Each time a user requests access to the entity, the data entity's ACL is searched to determine whether the requested access is authorized. Another technique involves the storage of a capabilities list for each user. The capabilities list for a given user will typically include a list of the objects to which the user has access, together with the operations that can be performed by the user on each listed object. Both the ACL technique and the capabilities list technique are described in Silberschatz and Galvin, *Operating System Concepts, Fourth Edition*, Addison-Wesley Publishing Company, 1994.

With the increasing popularity of on-line services networks, and with the increasing need for such networks to provide limited user access to the Internet, it has become increasingly important to be able to provide large numbers of users with controlled access to large numbers of content entities. In the network described in the above-referenced application, for example, it is contemplated that the number of subscribers may be in the millions, and that the number of content entities may be in the tens of thousands. To provide flexibility, it is also desirable to be able to individualize the access rights of users.

Although prior art access control techniques such as those summarized above are suitable in theory for flexibly controlling user access in large-scale on-line services networks, these techniques tend to produce prohibitively large quantities of access rights data. For example, in a network having millions of users, the access control list technique might produce access control lists that have millions of entries. These large quantities of access rights consume large amounts of memory, and often take unacceptably long periods of time to search.

A need thus exists in the art for a technique that is suitable for flexibly controlling the access of a large number of users to a large number of data entities. A need also exists to be able to flexibly and efficiently define new types of access operations as new on-line services and new content entities are created.

SUMMARY

In accordance with the present invention, there is provided a system and method for controlling user access to data entities in a computer network. The data entities are preferably in the form of content objects of an on-line services network, although the system and method can be used to control access to other types of data entities.

In a preferred implementation of an on-line services network in which the present invention is embodied, the content objects are stored on multiple application servers of the network, and represent the on-line services and service data that is accessible to users of the network. Examples of content objects include bulletin board system (BBS) messages and folders, Chat conferences, download-and-run files, and service applications which implement specific on-line services. Users access these content objects by connecting to different application servers and corresponding services in the course of a logon session.

Service applications running on the application servers implement various on-line services, such as Chat, Mail, BBS, FTM (File Transfer Manager) and Mediaview. One on-line service, referred to as the Directory Service, maintains a directory structure of the content objects that are accessible to users, with the content objects forming nodes of the tree-like directory structure. By sending properties of these nodes to a client application running on the computer of an end user, the Directory Service provides the user with a hierarchical, navigable view of the content of the network.

In accordance with the invention, different users of the network (including both subscribers and system administrators) are given different access rights with respect to different content objects, and can thus perform differing types of operations with respect to the content objects. For example, with respect to a given BBS folder, some users may be prevented from seeing or otherwise accessing the folder, some may be given read-only access to the contents of the folder, some may be given the capability to create new messages within the folder, and some may additionally be given the capability to delete and/or rename messages within the folder.

In accordance with one feature of the present invention, the access rights of the users of the network with respect to the various user-accessible content objects are specified by access rights data that is stored within an access rights database. The access rights database is implemented as a relational database on one or more security servers, which are connected to the application servers by a local area network. The access rights data is stored within the relational database in association with multiple content category identifiers, or "tokens," which identify categories or groupings of content objects (such as "internal public data," "Internet public data," and "18-and-older only data") for security purposes. The various content categories are preferably defined by system administrators. The content categories, rather than the content objects, serve the basic content units to which user access rights may be specified. The use of content categories eliminates the need to store access rights data on a per-object basis, and thereby significantly reduces the quantity of access rights data that needs to be stored.

The access rights data is preferably stored within the relational database in further association with multiple user group identifiers, which identify user groups (such as "everyone," "allsysops," and "guests") that have been formed for the purpose of storing access rights data. By storing access rights data primarily on a per-user-group basis, rather than separately storing the access rights of each individual user, the use of user groups further reduces the quantity of access rights data that needs to be stored.

The use of content categories and user groups advantageously allows access rights to be specified for large numbers of users (typically millions) with respect to large numbers of content objects (typically thousands) with a high degree of granularity.

In accordance with another feature of the invention, the service applications running on the various application servers initiate user-specific queries of the access rights database to obtain access rights lists of specific users. With each user-specific access rights query, the security server that receives the query accesses the access rights database and generates an access rights list which fully specifies the access rights of the user. This access rights list is returned to the application server that generated the query, and is stored within an access rights cache of the application server. The service which initiated the query can then rapidly determine the of access rights of the user with respect to specific content objects (as described below) by accessing its locally-stored copy of the user's access rights list. Because a user may be connected simultaneously to multiple application servers of the on-line services network (when, for example, the user opens multiple services), the access rights list of a given user may be stored concurrently within the respective caches of multiple application servers.

In accordance another feature of the invention, the access rights list of each user includes pairs of tokens and corresponding access rights values. Each token in the list identifies a content category to which the user has at least some access rights. For example, a token of "5" in the list indicates that the user has access to all content objects which fall within content category 5. Each access rights value in the list specifies the access rights of the user with respect to a corresponding content category. The access rights values are preferably in the form of privilege level masks which specify one or more general privilege levels (such as "viewer," "user," "host," "sysop," and "supersysop"). These general privilege levels are translated into specific sets of access capabilities by the on-line service applications. For example, the BBS service may give users with sysop-level privileges the capability to delete and rename BBS messages.

In accordance with another feature of the invention, when it becomes necessary for a service (running on an application server) to determine the access rights of a user with respect to a specific content object, the service initially reads the object's token, which is preferably stored as a property of a corresponding Directory Service node. This token specifies the content category to which the content object belongs. The service then generates an API (application program interface) call, which causes the application server to search its access rights cache for the user's access rights list, and if found, to search the access rights list for the token. If the user's access rights list is not found, the API initially generates a query of the access rights database (to fill the cache with the user's access rights list), and then begins to search the cache for the token. If the token is found, the API returns the corresponding access rights value to the service that generated the API call. If the token is not found, the API returns a code indicating that the user cannot access the content object.

In accordance with yet another feature of the present invention, the relational, access rights database includes three tables. The first table is a group-member table which specifies the user groups and the members (i.e., user accounts) of each user group. Each user of the network is a member of at least one user group, and may be a member of multiple groups. The second table is a group-token table which contains, for each user group, a group-based access rights list (in the form of a list of tokens and corresponding access rights values). Each group-based access rights list specifies the group-based rights which are provided to all members of the respective group. The third table is an account-token table, which specifies, on a single-user basis (for certain users), additional rights that are to be added to the group-based rights of the user. Each user-specific entry in the account-token table is preferably in the form of a single token plus a corresponding access rights value.

In addition to (or in place of) the account-token table, an exclusion table may optionally be implemented to specify access rights that are to be taken away from the accounts of specific users. As with the account-token table, each user-specific entry in the exclusion table is preferably in the form of a single token plus a corresponding access rights value. The exclusion table is useful, for example, for taking away certain privileges of users who misuse certain services.

Upon receiving a user-specific access rights query, the security server initially accesses the group-member table to identify all user groups of which the specified user is a member. The security server then accesses the group-token table to obtain the group-based access rights list of each user group of which the user is a member. The security server thereby identifies all of the rights the user has by virtue of being a member of one or more user groups. If the user is a member of multiple user groups, the multiple group-based access rights lists are combined so that the user is given all of the rights associated with all user groups of which the user is a member. The security server then accesses the account-token table to determine whether any additional (or "special") rights (in the form of tokens and corresponding access rights values) have been added to the account of the user. If one or more entries exist in the account-token table for the user, these entries are combined with the user's group-based rights to generate the user's access rights list. (For embodiments that include an exclusion table, if one or more entries exist for the user in the exclusion table, these entries are subtracted from the user's group-based rights.) The access rights list is then sorted such that the tokens of the list (and corresponding access rights values) are placed in numerically ascending order (to facilitate cache searches of the list), and the sorted list is transmitted to the application server that generated the query.

The system and method of the present invention advantageously enabled system administrators to flexibly control user access to different "service areas" in order to achieve a variety of objectives. In accordance with a preferred mode of operation, when a new service area (preferably represented by one or more nodes of the directory structure) is created, a security token may be assigned to the new service area to provide separate security for the area. A particular user, who may be either a subscriber to the network or a system administrator, may then be given sysop-type privileges (via the above-mentioned account-token table) to the new service area. By making different users sysops with respect to different service areas, the responsibility of monitoring user-generated content is distributed among many different individuals. In accordance with another preferred mode of operation, content categories and user groups are formed so as to create many different communications forums (such as Chat conferences and BBS folders) for private correspondence among user-specified subgroups of users.

BRIEF DESCRIPTION OF THE DRAWINGS

These and other features of the invention will now be described with reference to the drawings of a preferred embodiment, which is intended to illustrate and not to limit the invention, and in which:

FIG. 4A illustrates how the access control matrix of FIG. 3A is preferably compressed horizontally by the assignment of content nodes to content categories, with each content category identified by a numerical security token.

FIG. 4B is a token definition table which illustrates a preferred basic set of security tokens (tokens 1–4), and which illustrates examples of tokens (tokens 100 and 101) which may be added to accommodate specific data types.

FIG. 5A illustrates how the access control matrix of FIG. 3A is compressed vertically by the assignment of users to user groups.

FIGS. 5B is a group definition table which shows a preferred basic set of user groups, and which illustrates one possible assignment of group IDs to user groups.

Figure 1:
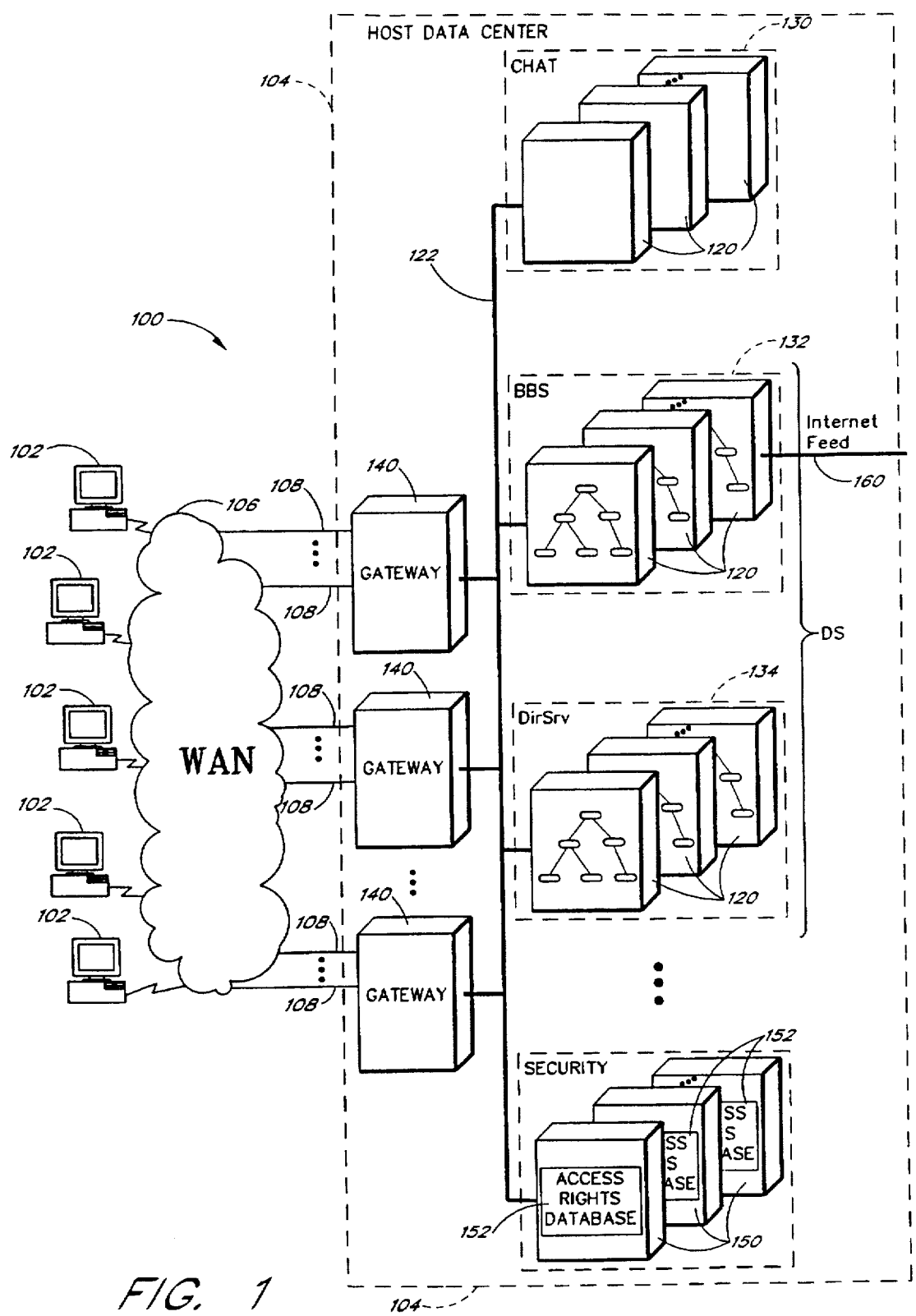
FIG. 1 is a high level diagram illustrating the general architecture of an on-line services network which provides access control in accordance with the present invention.

Reference numbers in the drawings have three or more digits; the two least significant digits are reference numbers within the drawing, and the more significant digits indicate the figure in which the item first appears. For example, reference number 602 refers to an item which is first shown in FIG. 6. Like reference numbers indicate like or functionally similar components.

DETAILED DESCRIPTION OF A PREFERRED EMBODIMENT

Described herein is a system and method for controlling the access rights of users of an on-line services network to content entities such as bulletin board messages, message folders, chat conferences, service applications, download-and-run files and data files. As will be recognized by those skilled in the art, the system and method of the present invention are generally independent of the specific type or types of data entities to which access is being controlled. For example, the data entities could be low-level software and/or hardware resources such as threads, semaphores, memory segments and CPUs. It will further be recognized that the system and method of the present invention could be employed in any of variety of alternative networking environments, including file systems and operating systems.

For convenience, the description of the preferred embodiment is broken up into the following 12 sections:

1. ARCHITECTURAL OVERVIEW (FIG. 1);
2. OVERVIEW OF CHAT AND BBS SERVICES;
3. OVERVIEW OF DIRECTORY SERVICE AND SECURITY (FIG. 2);
4. ACCESS RIGHTS (FIGS. 3A AND 3B);
5. COMPRESSION BY GROUPING OF OBJECTS (FIGS. 4A AND 4B);
6. COMPRESSION BY GROUPING OF USERS (FIGURES 5A AND 5B);
7. ACCESS RIGHTS DATABASE (FIG. 6);
8. QUERIES OF ACCESS RIGHTS DATABASE (FIGS. 7 AND 8);
9. ACCESS RIGHTS CACHE (FIG. 9);
10. GetAccountRights METHOD (FIG. 10);
11. ASSIGNMENT OF TOKENS AND FORMATION OF USER GROUPS; and
12. OTHER EMBODIMENTS The first of these sections provides an overview of the on-line services network in which the present invention is employed. The architecture of this network is further described in the above-referenced, commonly assigned application having the title "ARCHITECTURE FOR SCALABLE ON-LINE SERVICES NETWORK" (U.S. Ser. No. 08/472,807), which is incorporated herein in by reference.

1. Architectural Overview (FIG. 1)

FIG. 1 is a high level diagram illustrating the general architecture of an on-line services network 100 which provides access control in accordance with the present invention. Multiple client microcomputers 102 are connected to a host data center 104 by a wide area network (WAN) 106. The wide area network 106 includes WAN lines 108 which are provided by one or more telecommunications providers, and which allow end users (i.e., users of the microcomputers 102) over a wide geographic area to access the host data center 104. The WAN lines 108 may include, for example, X.25 lines, TCP/IP lines, and ISDN (Integrated Service Digital Network) lines. The host data center 104 provides a variety of information-related and communications-related on-line services to end users.

The host data center 104 comprises a plurality of application servers 120 connected to one or more high speed local area networks (LAN) 122. The application servers 120 are preferably Pentium-class (or better) microcomputers which are scalable to at least four central processing units (CPUS), and which run the Microsoft Windows NT operating system available from Microsoft Corporation. Each application server 120 typically has at least 128 MB of random-access memory (RAM) and at least 4 GB of disk space.

The application servers 120 are arranged into service groups (also referred to as "AppGroups") that correspond to specific on-line services. Each service group runs a particular service and provides access to a corresponding data set. Three example service groups are shown in FIG. 1: a CHAT service group 130, a bulletin board system (BBS) service group 132, and a DirSrv service group 134. Additional service groups (not shown) are provided to implement other on-line services, including Mediaview (a service which provides multimedia titles to end users), Mail (an email service), FTM (a service for uploading and downloading files) and Component Manager (a service which allows users to update client software when new releases become available). Other on-line services may include, for example, an interactive games service, a file transfer service, a weather service, and a World Wide Web browsing service. A service group can have as few as one application server 120. System administrators can adjust the number of application servers 120 in a given service group to accommodate the current usage level of the corresponding service.

Also connected to the LAN 122 are multiple Gateway microcomputers 140 (hereinafter "Gateways") which link incoming calls from end users to the application servers 120. The Gateways are preferably Pentium-class microcomputers which are scalable to at least four central processing units (CPUs), and which run the Microsoft Windows NT operating system. Each Gateway 140 typically has at least 64 MB of RAM and at least 2 GB of disk space, and is capable of supporting approximately 1000 simultaneous user connections.

Also connected to the LAN 122 are multiple security servers 150. The security servers 150 are preferably Pentium-class microcomputers which are scalable to at least four central processing units (CPUs), and which run the Microsoft Windows NT operating system. Each security server 150 maintains a relational database 152 (i.e., a database in which the contents are organized as a set of two or more interrelated tables) which contains the access rights data for all users of the network 100. In the preferred embodiment, the security servers 150 are replicated, meaning that they store and provide access to the same access rights data. In other embodiments, the access rights data may be partitioned across the security servers 150.

Each security server 150 runs Structured Query Language (SQL) code to provide access to its respective access rights database 152. SQL is a programming language standardized by the International Standards Organization (ISO) for defining, updating and querying relational databases. A query to the access rights database 152 can emanate either from one of the application servers 120 (when, for example, a user attempts to access a content object which is stored by the application server 120), or by one of the Gateways 140 (when a user attempts to open an on-line service). In accordance with one feature of the present invention, each machine 120, 140 which generates queries of the access rights database 152 implements an access rights cache for locally storing user-specific access rights information obtained from the database 152. In other embodiments, all access rights queries may be generated by a single group or type of machine (e.g., the Gateways 140, or a group of logon servers), and these machines may be configured to pass the user-specific access rights information read from the database 152 to the various application servers 120 to which the user connects.

Various other types of servers and other microcomputers are connected to the LAN 122 but are not shown in FIG. 1. For example, billing and logon servers are provided to record billable events and to handle user logon, respectively. Further, Arbiter microcomputers are provided to perform transaction replication services for certain service groups, allowing the application servers of such service groups to store identical copies of the same service content data.

It is envisioned that the host data center 104 may have on the order of one hundred Gateways 140, and between several hundred and several thousand application servers 120. A host data center of this type will be able to handle millions of subscribers and tens of thousands of simultaneous user logon sessions. Advantageously, the processing capacity of the host data center 104 can easily be increased (to support new services, and to support increases in the number of subscribers) by connecting additional Gateways 140 and application servers 120 to the LAN 122, and by adding additional local area networks. Further, additional host data centers 104 can be provided at different geographical locations to accommodate a wide geographic distribution of subscribers.

"Users" of the on-line services network 100 include both "end users" (typically subscribers) who log onto the system from client microcomputers 102 via the WAN 106, and "internal" users (typically system administrators) who access the system from computers that are connected directly to the LAN 122. Each user of the network, whether an end user or an internal user, is identified by a unique 32-bit account number. As described below, different users have different access privileges with respect to various data entities on the network.

The on-line services offered to end-users of the network 100 are in the form of client-server applications programs (or "service applications"). Each service application includes a server portion that runs on one or more of the application servers 120, and at least one corresponding client portion (also referred to as a "client application") that runs on a microcomputer 102 of an end user. In the presently preferred embodiment, the client applications are in the form of Microsoft Windows 95 components (including dynamic link libraries, other executables, and data files), and the server portions are implemented primarily as dynamic link libraries running under the Microsoft Windows NT Operating System.

With reference to FIG. 1, the server portions of the various on-line services are implemented on the application servers 120 of the respective service groups 130, 132, 134. Each application server 120 of a given service group separately runs the same server application. For example, each application server 120 of the Chat service group 130 runs CHAT.DLL, which is a dynamic link library that implements the server portion of the Chat service. Similarly, each application server 120 of the BBS service group 132 runs a BBS dynamic link library, and each application server 120 of the DirSrv service group 134 runs a DirSrv dynamic link library. Although each application server 120 is shown in FIG. 1 as being allocated to a single service group, a single application server can simultaneously run multiple service applications, and thus be allocated to multiple service groups. For example, a single application server 120 could run both the Chat and BBS dynamic link libraries and thus be allocated to both the Chat and BBS service groups 130, 132.

During a typical logon session, a client microcomputer 102 will maintain a communications link with a single Gateway 140, but may access multiple on-line services (and thus communicate with multiple application servers 120). To initially access a service, an "open" request is generated on the client microcomputer 102 and sent to the Gateway 140 that is handling the logon session. The Gateway 140 then selects a single application server 120 (of the appropriate service group) to handle the service session, and opens a pipe (or other type of connection) over the LAN 122 to the selected application server 120.

Throughout the service session, the Gateway 140 routes messages between the client microcomputer 102 and the application server 120 as the client and server portions of the service application communicate. The Gateway 140 also performs protocol translation between the protocol of the WAN 106 and the protocol of the LAN 122. To terminate the service session, a "close" request is generated at the client microcomputer 102 and sent to the Gateway 140, and the Gateway 140 closes the pipe to the application server 120 that is handling the service session.

The architecture advantageously supports multiple simultaneous service sessions per user. Thus, a user may be connected to multiple applications servers (via the Gateway 140 handling the logon session) simultaneously.

2. Overview of Chat and BBS Services

Two specific on-line services, Chat and BBS, will now be briefly described. This description will illustrate some of the specific types of content entities (referred to herein as "content objects," or simply "objects") which may be accessed by users, and will also illustrate some of the different types of access rights users may be given with respect to such content objects.

The Chat service is an interactive communications service which allows users to have real time conversations with other users on specific topics. Chat conversations or "conferences" are organized as "Chat rooms" which may be entered or exited by end users to join or leave the corresponding conferences. For example, an end user may enter a "sports" Chat room to join an interactive conversation on sports-related topics. Participants in a Chat conference can type in textual messages which will be displayed on the monitors of other participants. Voice and/or video capabilities may additionally be provided.

The BBS service allows users to post and/or review messages. Users can thereby ask and answer questions, or otherwise conduct non-real-time conversations with other users. Although shown as a single BBS service group 132 in FIG. 1, multiple BBS service groups may be formed, with each corresponding, for example, to a particular topical area. In the preferred implementation, replicated copies of all BBS content (e.g., BBS messages and folders) are stored on each application server 120 of the BBS service group 132. This allows the BBS application servers 120 to independently process message read requests from end users. Replication of BBS content is accomplished using the Arbiter transaction replication service. A preferred embodiment of the Arbiter service is described in commonly assigned U.S. application Ser. No. 08/485,493, filed Jun. 7, 1995, having the title TRANSACTION REPLICATION SYSTEM AND METHOD FOR SUPPORTING REPLICATED TRANSACTION-BASED SERVICES.

With reference to FIG. 1, one of the application servers 120 of the BBS service group 132 is preferably configured as an Internet feed server 120. The BBS Internet feed server 120 reads Internet newsgroup messages and posts these messages (by submitting update transactions to the Arbiter service) within the BBS service group 132, thereby providing users with access to such newsgroup messages. The BBS Internet feed server 120 is also used to post messages to the Internet.

Chat rooms and BBS messages are two types of content objects that may be accessed by users. BBS folders (objects which contain BBS messages and/or other BBS folders) are another type of content object that may be accessed.

The ability to access a given content object, and the access rights of the user with respect to that object, may vary from user to user. Using a Chat room object as an example, some users may be "participants" who can participate in the conference, while other users may be "viewers" who can only view the text of the conversation. One user may further be designated as the "host" of the conversation. The host normally has the responsibility of moderating the conversation, and has the ability to modify the access rights of members of the conversation. For example, if a user fails to comply with the rules of the Chat conference, the host can set that user's privilege level to "viewer," preventing the user from further participating in the conversation. Access rights of users are preferably controlled (typically by system operators or administrators) by updating entries in the access rights database 152, as described in detail in the following sections.

As with Chat objects, the access rights of users with respect to different BBS objects (e.g., BBS folders and messages) may vary from user to user. For example, certain BBS folders may be designated as "public," meaning that they can generally be accessed by all users, while other BBS folders may be designated as "private," meaning that access to such folders is restricted to some subgroup of users. A private folder may be used, for example, to permit private personal correspondence between a user-specified group of family and friends.

The specific types of operations allowed with respect to a BBS object may vary from user to user. For example, some users may have read-only access within a BBS folder, in which case they will not be able to reply to an existing BBS message in that folder and will not be able add a new message to the folder. Other users may be able to add new BBS messages to the folder and/or reply to existing messages, but not delete existing messages.

Other users, generally referred to as "sysops" (system operators), may be given the ability to delete existing messages from the folder. Different end users can be designated by the on-line services network provider (i.e., the owner or operator of the host data center 104) as the sysop for a particular folder or group of folders. Thus, for example, a particular end user may be placed in charge of a football BBS folder, while another end user may be placed in charge of a baseball BBS folder. This advantageously allows the on-line services network provider to distribute the responsibility of monitoring BBS content among a large number of end users.

Users at the system administrator level may be given the additional capability of creating new BBS folders, deleting existing BBS folders, and/or changing the access rights of users with respect to BBS folders.

The foregoing examples illustrate some of the specific types of access privilege levels which may be assigned to users with respect to certain object types, and illustrate some of the reasons for assigning different levels of access rights. As additionally illustrated by the foregoing, it is often desirable to define different (and often unique) types of accesses for different on-line services and object types. For example, for the Chat service, it is desirable to have the above-described viewer, participant and moderator type access privileges, even though the operations corresponding to these privileges are generally unique to the Chat service.

It will also be recognized that as new on-line services and new object types are added to the network 100, it may be necessary or desirable to define new types of access operations. To facilitate the addition of new on-line services and object types, the network 100 provides for a specified set of privilege levels (such as "viewer," "observer," "user," "host," "sysop," and "sysop manager") which can be assigned to users, and it is left to the on-line services themselves (i.e., to the authors of the service applications) to define the specific access capabilities that go along with each user privilege level. For example, for a user that has been assigned the general privilege level of "user," the Chat service may give the user "participant" level access to all public Chat rooms, while the BBS service may allow the user to read, generate and reply to BBS messages within all public BBS folders. This feature of the present invention is further described below under the heading ACCESS RIGHTS.

Figure 2:
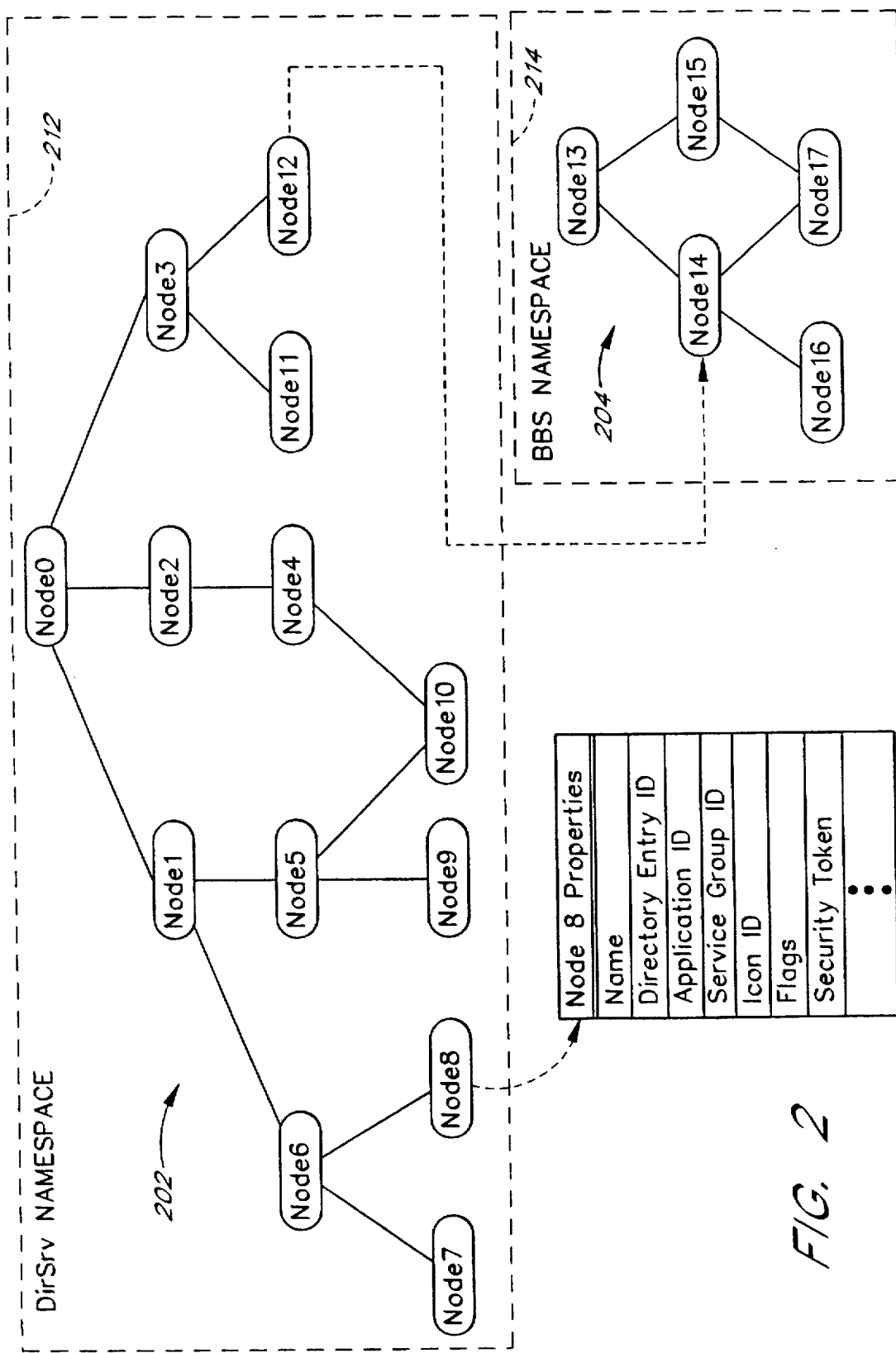
FIG. 2 illustrates how the content of the on-line services network of FIG. 1 is preferably arranged within a tree-like directory structure of content nodes.

3. Overview of Directory Service and Security (FIG. 2)

The following is an overview of the Directory Service, which is an on-line service that allows users to explore the content (i.e., the on-line services and associated data entities) of the network 100. The Directory Service is described in detail in a concurrently filed U.S. application having the title DIRECTORY SERVICE FOR A COMPUTER NETWORK, which is incorporated herein by reference. Included in this overview is a brief description of how the Directory Service and other services determine the access rights of users with respect to specific content objects.

The Directory Service provides users with a hierarchical view of the various content objects available on the network 100. As further described below, the content objects are arranged within hierarchical directory structures 202, 204 (FIG. 2) that are maintained by the Directory Service, with the content of the content objects represented as nodes of these structures 202, 204.

The content of the network 100 is displayed to the end user via a network shell program which runs on the client microcomputers 102 of end users. The network shell is the primary client of the Directory Service. A preferred implementation of the network shell is described in a commonly-assigned U.S. application having the title ON-LINE NETWORK ACCESS SYSTEM, filed Jul. 17, 1995. In the preferred embodiment, the network shell is an integral part of the Microsoft Windows 95 Explorer program (hereinafter "the Explorer") which is described in *Inside Windows95*, Microsoft Press, 1994.

A graphical user interface of the Explorer displays the content objects as a logical extension of the user's hard drive, with each object shown as an icon and/or a textual name. Using the Explorer, users can browse the content of the network 100, and can access the various content objects (to, for example, enter a specific on-line service). To access a content object, the user double clicks on the icon for that object. As further described below, the Directory Service only "shows" those content objects to which the particular user has access. Thus, the user is provided with a filtered view of the actual content of the network 100.

With reference to FIG. 1, the Directory Service (abbreviated as "DS" in FIG. 1) includes two separate services, the DirSrv service (implemented on the DirSrv service group 134) and the BBS service (implemented on the BBS service group 132). The DirSrv service is the "root" of the Directory Service, and provides users with a hierarchical, navigable view of all non-BBS content objects. These non-BBS content objects are arranged within the DirSrv directory structure 202. The BBS service acts as its own directory service provider, and provides users with a navigable, hierarchical view of all BBS content objects. The BBS content objects are arranged within the BBS directory structure 204. A seamless interface between the DirSrv and BBS services allows users to transparently traverse between the two directory structures 202, 204, so that the Directory Service appears as a single service to end users, and so that the two directory structures 202, 204 appear as a single tree-like directory structure.

The DirSrv and BBS services are both "directory service providers," meaning that they act as the Directory Service with respect to corresponding portions of the network content. Additional directory service providers can be added to the Directory Service as the content of the network 100 grows. For example, an investment service that provides data on stocks and mutual funds could be added which acts as a directory service provider with respect to its own content.

FIG. 2 illustrates the general organization of the content objects within the directory structures 202 and 204, as maintained by the Directory Service. Each content object is represented as a corresponding node of one of the directory structures 202, 204. The first directory structure 202 exists within the DirSrv namespace 212, and represents the content that is accessible through the DirSrv service. The second hierarchical structure 204 exists within the BBS namespace 214, and represents the content that is accessible through the BBS service. Each structure 202, 204 may have thousands of nodes, and could thus represent thousands of content objects. The nodes can generally be thought of as "service areas" that can be entered by users. Links between nodes represent paths that can be taken by users in traversing the hierarchical structures 202, 204 from one service area to another. The specific nodes and links shown in FIG. 2 are provided to show the general manner in which nodes are arranged, and do not represent an existing directory structure.

The hierarchical directory structures 202, 204 are preferably in the form of directed acyclic graphs. As is well known in the art of file systems, an acyclic graph structure is more flexible than a tree structure, since an acyclic graph allows a node to have multiple parent nodes. (A "parent" of a given node is any node that is both (1) directly connected to the given node, and (2) at a higher level in the hierarchy than the given node. Similarly, a "child" is any node that is both (1) directly connected to the given node, and (2) at a lower level than the given node.) This characteristic of the directory structures 202 and 204 is illustrated by nodes 10 and 17, each of which has two parent nodes. To simplify the following description, the term "Directory Service structure" will be used to refer collectively to the DirSrv and BBS directory structures 202 and 204.

There are three different types of nodes within the Directory Service structure: leaves, folders and junction points. A set of flags stored in association with each node identifies the node as one of these three types. Leaves (or "leaf nodes") are nodes that both (1) cannot have children and (2) do not serve as junction points. The leaf nodes in FIG. 2 are nodes 7–11, 16 and 17 (assuming that these nodes cannot have children). Leaves normally represent the actual services within network 100. Examples of leaves include Chat rooms, BBS messages, Mediaview titles and download-and-run files. When the user clicks on a leaf node (by double clicking on the corresponding icon from a window of the Explorer client), the corresponding service-related action is taken. For example, if the user double clicks on a Chat room icon, the Chat service is opened and the user is added to the corresponding Chat conference. When the user double clicks on a leaf node for a download-and-run file, the file is downloaded to the user's computer 102 for execution.

Folders are nodes that both (1) can have children and (2) do not serve as junction points. The folder nodes in FIG. 2 are nodes 0–6 and 13–15. Folder nodes normally represent collections of other content objects, and are used to organize the content of the network. For example, a folder node may correspond to a BBS folder on a particular topic, or may represent a collection of BBS folders and Chat rooms on a related topic. Folder nodes are also used to generally arrange content objects according to language. For example, node 1 may be an english folder containing content objects that are primarily in english, and node 2 may be a spanish folder containing content objects that are primarily in spanish. Folder nodes are generally analogous to the directories of a file system.

The third type of node is a junction point. Junction point nodes serve as proxies for nodes in other Directory Service namespaces, and are used to allow the user to seamlessly traverse between namespaces. The only junction point shown in Figure is node 12, which serves as a proxy for BBS folder node 14 (referred to as the "target node"). When, for example, the user double clicks on node 12, the Explorer launches a BBS navigator and shows the user the children of node 14.

The Dirsrv and BBS services store their respective nodes as lists of node properties, as illustratively shown for node 8 in FIG. 2. The DirSrv and BBS service also keep track of the locations of the nodes within their respective directory structures 202, 204. As pictorially illustrated in FIG. 1, the full DirSrv directory structure 202 (i.e., the nodes within the DirSrv namespace 212 plus the arrangement of the nodes within the directed acyclic graph) is stored on each of the application servers 120 of the DirSrv service group 134. Similarly, the full BBS directory structure 204 is stored on each of the application servers 120 of the BBS service group 132. Depending upon the object type, certain of the node properties stored by the Directory Service may be service-specific. For example, BBS message nodes preferably include a BBS-specific "attachments flag" which indicates whether a file attachment is included with the message. Other properties are general in nature, and are shared by most or all of the Directory Service nodes. The following is a brief description of some of these general properties.

Name. This is a human readable name which may be displayed by the Explorer along with the corresponding icon. For example, a folder node could have the name "Health & Fitness," and could have children folder nodes with names of "Health & Fitness Chat" and "Heath & Fitness BBS." (For junction point nodes, the name of the target node is used).

Directory Entry ID (DEID). This is an 8-byte number which uniquely identifies a node within its respective Directory Service namespace. Every node has a DEID.

Application ID (APPID). This is a 4-byte number which is stored as a property of every node. For leaf nodes, this number identifies the service application associated with the node, and is used by the Explorer to launch the service application when the user double-clicks on the node. For non-leaf nodes, the APPID indicates the namespace (DirSrv or BBS) in which the node resides.

Service Group ID. (Also referred to as the data set ID.) This is a 2-byte number which identifies the service group (132 or 134) of the Directory Service provider.

Icon ID. This is an identifier of the icon which is to be displayed by the Explorer as a representation of the node. Icon bitmaps are stored by the Directory Service, and are sent over the network upon request by the Explorer.

Flags. The flags indicate whether the node is a folder, leaf, or junction point.

Security Token. This is a 4-byte value which identifies a content category to which the node has been assigned for security (i.e., access rights) purposes. When a user attempts to access a node, the node's security token and the user's 32-bit account number are used to determine the user's access rights with respect to the node. (For junction point nodes, the security token of the target node is used). Security tokens are described in detail below under the heading COMPRESSION BY GROUPING OF OBJECTS.

Although the terms "node" and "content object" will be used somewhat interchangeably throughout the following description, it should be understood that each node is simply a list of content object properties stored by the Directory Service. In the case of a leaf node, this list of properties will typically correspond to a content object which is stored on some other application server 120. For a Chat room object which resides on a Chat server 120, for example, the corresponding node will be a list of the properties for the Chat room, and will be stored on each of the DirSrv servers 120. For folder nodes which simply represent groupings of other nodes, the folder node and folder content object are essentially the same entity.

Nodes of the Directory Service structure are preferably added, deleted and modified using "Sysop Tools," which is a client application of the Directory Service. As will be appreciated by those skilled in the art, various conventional editing tools can be used for this purpose. To create a node using Sysop Tools, the user must specify at least the DEID, APPID and the service group ID of the node. The Sysop Tools client is further described in a commonly-assigned, concurrently filed U.S. application having the title SYSTEM AND METHOD FOR EDITING CONTENT IN AN ON-LINE NETWORK.

The Directory Service operates generally as follows. In response to requests from the Explorer, the Directory Service sends node properties over the WAN 106 to the client microcomputer 102, allowing the Explorer to reconstruct user-selected portions of the Directory Service structure on the user's screen, and/or allowing the Explorer to display user-specified object properties (such as the number of users in a Chat room) to the end user. To avoid unnecessary transfers of information over the WAN 106, the Directory Service only returns those properties that are specifically requested by the Explorer. When the user double clicks on a folder node, the Explorer uses a GetChildren API (application program interface) to generate a request to the Directory Service for the children of the folder node, specifying as parameters of the API the DEID of the folder node plus the names of the specific properties needed to display the children of the folder node. When the user double clicks on a leaf node, the Explorer initiates a service session with the corresponding service, using the leaf node's APPID to identify the appropriate service application.

Before "showing" a node to the end user (by returning the requested properties of the node to the Explorer), the Directory Service uses a GetAccountRights API to determine the access rights of the user with respect to the node (or equivalently, with respect to the corresponding content object), and to thereby determine whether the user is authorized to access the node. This access rights information is stored within the access rights database 152 on each security server 150. If the user is not authorized to access the node, the Directory Service does not return the properties of the node, and the node is not displayed to the user. By way of example, suppose that a user double clicks on the icon corresponding to node 6 in FIG. 2. This will cause the Explorer to send a GetChildren request to the Directory Service. As parameters of the GetChildren request, the Explorer specifies the DEID of node 6, and specifies the properties (typically the name, DEID, APPID, flags and icon ID) to be returned for each child node. If, for example, the user is authorized to access node 7, but is not authorized to access node 8, the Directory Service will return only the properties of node 7. Thus, node 8 will not appear in the Explorer window on the user's screen.

This feature of the invention advantageously allows certain nodes and content objects to be completely hidden from certain classes of users. For example, this feature may be used to hide from the view of regular users a BBS folder (and its contents) that has been created for private correspondence between members of a family, so that the only users who can see the folder (via the Explorer or other client application) are the designated family members. Because only those authorized to access each node can see the node, a high degree of security is provided against unauthorized accesses.

To determine the user's access rights with respect to the node, the Directory Service initially reads the 32-bit security token associated with the node (which, as described above, is stored as a node property). The Directory Service then generates a GetAccountRights call, specifying as parameters of the call the node's security token and the user's 32-bit account number. The GetAccountRights API returns either a 16-bit access rights value which indicates the user's access rights with respect to the node, or else returns a code indicating that the user is not authorized to access the node. The GetAccountRights API includes code which generates queries to the access rights databases 152 to obtain user-specific access rights lists, and also includes code which implements an access rights cache for locally storing these user-specific lists. The GetAccountRights API and a preferred implementation of the access rights cache are described in detail in sections 8–10 below.

In the preferred implementation of the network 100, various forms of "direct navigation" are possible, wherein the user can access content objects without initially placing a Directory Service call. Using a "shortcuts" feature, for example, a user can create an icon that allows the user to subsequently return to a service area (such as a Chat room) without navigating the Directory Service structure. (The shortcuts feature is described in the above-referenced application of the title ON-LINE NETWORK ACCESS SYSTEM.) The Directory Service thus cannot be relied upon for ensuring the security of all content objects.

To ensure that the access rights of users are checked when direct navigation techniques are used, various other entities of the network 100 (in addition to the Directory Service) are preferably configured to call the GetAccountRights API. For example, the Chat service calls GetAccountRights to determine the rights of users with respect to Chat rooms, the Mail service calls GetAccountRights to determine whether users are authorized to send mail to specific distribution lists, and the FTM service calls GetAccountRights before downloading a file requested by a user. To provide an extra "layer" of protection, the Gateways 140 are preferably configured to call GetAccountRights whenever a user attempts to open a pipe to a service (as described below).

Although the architecture of the preferred embodiment allows a wide variety of different services and machines to generate queries of the access rights database 152, it will be recognized that various alternatives are possible. For example, the network 100 may be configured such that the Directory Service is the only entity that generates queries of the access rights database 152, and all access requests may then be routed through the Directory Service. Alternatively, the Gateways 140 or logon servers (not shown) could be configured to generate a query of the access rights database 152 when a user initially logs onto the network, and the user-specific access rights list obtained from this query may then be forwarded to each application server 120 to which the user connects. Both of these alternative approaches reduce the frequency of queries of the access rights database 152.

4. Access Rights (FIGS. 3A and 3B)

Figures 3, 3A, 3B:
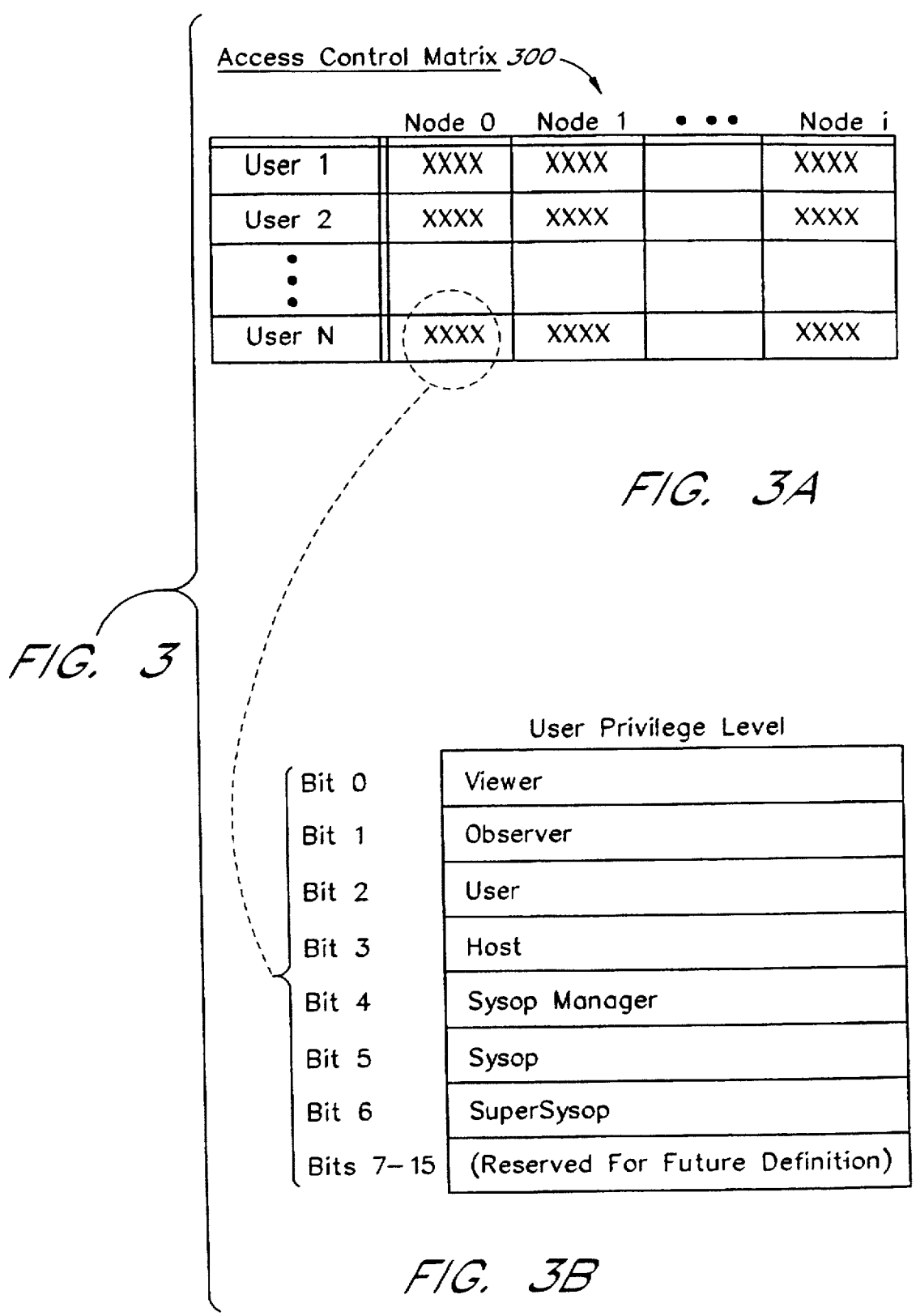
FIG. 3A illustrates an access control matrix which specifies, for each user and for each node of the directory structure of FIG. 2, whether the user can access the node, and if so, what the level of access is. The notation "XXXX" in FIG. 3A represents a 16-bit access rights value.
FIG. 3B illustrates a preferred basic set of privilege levels, and illustrates one possible assignment of access rights bits to the privilege levels.

FIG. 3A illustrates an access control matrix 300 which represents the access rights of users of the on-line services network 100. The information contained within the access control matrix 300 is stored in the access rights database 152 in a highly compressed form. Accordingly, the access control matrix 300 represents the information stored within the access rights database 152, but does not represent the actual organization of this information within the database. The preferred methods used for compressing the access control matrix 300, and the preferred implementation of the database 152, are described in the following sections. As described below, the access control matrix 300 (and thus the access rights database 152) specifies, for each user of the network, both (1) the content nodes that can be seen by the user via the Directory Service, and (2) the access operations that can be performed by the user with respect to each content node.

Each row of the access control matrix 300 corresponds to a respective user of the network 100. These users include various levels of subscribers and system administrators. The number of users will typically be in the millions. Thus, the access control matrix 300 will typically have millions of rows. Each column of the access control matrix 300 corresponds to a respective node of the Directory Service structure of FIG. 2. The total number of nodes in the Directory Service structure will typically be in the tens of thousands.

Each entry in the access control matrix 300 is in the form of a 16-bit access rights value (represented by the symbol "XXXX" in the figures), and specifies the access rights of a given user at a given node (or equivalently, specifies the rights of a given user with respect to a given content object). For example, the entry for user 1 at node 1 specifies the access rights user 1 has with respect to the content object corresponding to node 1 of the Directory Service structure. An entry of 0000H (in which "H" indicates the number is in hexadecimal) in the access control matrix 300 specifies that the user has no rights at the node, or equivalently, that the user cannot access the corresponding content object. The Directory Service will not show such a node to the user.

Thus, for example, if user 2 has an entry of 0000H for node 1, user 2 will not see the icon for node 1 when navigating the Directory Service structure via the Explorer. (As described below, entries of 00000H are not actually stored.)

In the preferred embodiment, the access rights values of the access control matrix 300 are generally in the form of privilege level masks, with each defined bit corresponding to a respective user privilege level. FIG. 3B illustrates a preferred basic set of user privilege levels, and the correspondence between these privilege levels and the bits of the access rights values. With reference to FIG. 3B, bits 0–6 correspond respectively to the user privilege levels of viewer, observer, user, host, sysop manager, sysop and supersysop, and bits 7–15 are reserved for future definition. Thus, for example, an access rights value of 0024 hexadecimal (bits 2 and 5 set to one, and all others clear) indicates user privilege levels of "sysop" and "user."

Although this approach uses a hierarchy of privilege levels, various non-hierarchical approaches are possible. For example, the access rights values may directly specify the access operations that can be performed by the users, with, for example, bit 0 specifying whether the user has read-only access, bit 1 specifying whether the user has read/write access, and so on.

In the preferred embodiment, the general privilege levels of FIG. 3B are transformed into specific access capabilities by the various on-line services (such as Chat, BBS, and the Directory Service). For example, the Chat service may give moderator-type access capabilities to users that have the privilege level of "host." The access capabilities corresponding to a given privilege level may vary from on-line service to on-line service. Generally, however, the access capabilities within a given on-line service will be consistent with the following privilege-level "definitions":

Viewer. The user can see the existence of the node, but cannot open or access the corresponding service. The user may be given the ability to subscribe to the service (to obtain a higher privilege level with respect to the service), and may be able to view certain (such as a textual description) properties of the node. (This is the lowest level of access rights a user can have with respect to a node. A user with no access rights with respect to a node cannot view the name, icon, or any other feature of the node).

Observer. The user can see the existence of the node and can open the service, but cannot actively participate in the service. (For example, an observer for a BBS folder node may be given read-only access to the messages within the folder). The user may be given the ability to subscribe to the service.

User. The user can do whatever is "normal" for the particular service. For example, the user may be given the ability to post BBS messages within public BBS folders, or may be given the ability to actively participate in public Chat conferences.

Host. The user is given host-level or leadership-level privileges (where applicable) for the service. For example, the Chat service may give the host user moderator privileges.

Sysop. The user is given the access rights consistent with normal (entry-level) sysop-type activities for the service, such as the ability to delete BBS messages, or the ability to edit a certain subset of the properties of a node.

Sysop Manager. The user is given various ownership-type privileges with respect to the node. For example, the sysop manager for a given node may be given the ability to change any of the properties (e.g., name, icon ID, etc.) for that node.

Supersysop. The user has the highest level of access authority provided by the service.

As indicated by the foregoing, the privilege level definitions are generally open ended, giving the various services flexibility in assigning specific access capabilities to users. This is particularly true for the privilege levels of "user," "host," and "sysop," which may be translated into significantly different access capabilities by different services.

Advantageously, the privilege levels are not limited to predefined accesses capabilities such as read-only, read/ write, modify, append and delete, but rather are flexible enough to include new types of access capabilities that may later be defined. Thus, as new types of access capabilities are defined (when, for example, new services and new object types are created), these new access capabilities can be implemented using the existing user privilege levels. In other embodiments of the invention, the access rights values may correspond uniquely to predefined sets of access operations.

By way of example, suppose that a voice-based Chat service is added which assigns a "voice override" priority level of either low, medium or high to each member of a given voice Chat conference, to thereby give certain users a greater degree of control over the conversation than others. To implement these three newly-defined access capabilities without defining new user privilege levels, bits 2, 3 and 5 in FIG. 3B (corresponding to user privilege levels of user, host and sysop) could be used, respectively, to specify voice override priority levels of low, medium and high.

With further reference to FIG. 3B, additional user privilege levels can be defined as needed (using bits 7–15) to achieve higher degrees of privilege-level granularity. Also, services can be configured to give special meaning to certain combinations of privilege level bits. For example, an on-line service could give special access capabilities to users that have both the "host" and "sysop" bits set.

To simplify the description which follows, the term "access rights" will hereinafter be used to refer generally to the access rights values, and to the privilege levels and/or access capabilities associated with these access rights values.

With reference to FIG. 3A, in a network that has on the order of millions of subscribers and thousands of content objects, the access control matrix 300 will be extremely large, and will normally exceed the virtual memory capacity of conventional servers. Thus, it would not be feasible to store the entire access control matrix 300 on a single server. Further, even if the access control matrix 300 were divided and stored across multiple servers, the time required to search the access control matrix 300 (to determine the rights of a user with respect to an object) would be long, and the user would therefore experience significant time delays when moving from object to object.

In accordance with the present invention, the above-described limitations are overcome by effectively compressing the access control matrix 300 both horizontally and vertically, to thereby reduce the quantity of access rights data that needs to be stored. Horizontal compression (the reduction of the number of columns) is effectively achieved by grouping together content objects which may be treating the same for security purposes. Vertical compression (the reduction of the number of rows) of the matrix 300 is effectively achieved by the formation of user groups. Each compression technique is described in detail below. The compression of the access control matrix 300 is "effective," rather than actual, since the access control matrix 300 is not ordinarily generated in the uncompressed form of FIG. 3A.

The compression of the access control matrix 300 advantageously enables the information contained therein to be stored on each security server 150 (within each relational access rights database 152).

5. Compression by Grouping of Objects (FIGS. 4A and 4B)

In accordance with the present invention, the number of columns of the access control matrix 300 is reduced by effectively grouping together the content objects that can be treated the same for security purposes, and then storing only the access rights information for each group (rather than each content object). With reference to FIG. 4B, each object group is identifiable by a mnemonic name ("Internal Public," "Internal 18-and-older," etc.), but is represented by a unique, 32-bit value referred to herein as the "security token" (or simply "token"). For example, the object group with the name "Internet 18-and-older" has a security token of 4(i.e., 0004H). The mnemonic names generally represent different content categories that have been defined for security purposes. To help to distinguish object groups from user groups (which are discussed below), the term "content categories" will be used herein to refer to the object groups. The security tokens serve as content category identifiers.

With reference to FIG. 4A, which illustrates the horizontally compressed access control matrix 300', each column of the matrix corresponds to one content category, and is represented by the content category's security token. Because the total number of content categories will normally be significantly lower than the total number of content objects, the number of columns will be significantly reduced over the access control matrix 300 of FIG. 3A.

With reference to FIG. 4B, each content category (i.e., object group) contains the content objects which fall within a predetermined security classification. For example, the category "Internet 18-and-older" contains all Internet objects which have been classified (typically by system administrators) accordingly. In the preferred embodiment, each content object (or equivalently, each node of the Directory Service structure) is assigned to exactly one content category, and a content category can contain as few as one content object.

As described below, security tokens are also preferably defined for certain non-Directory Service entities, such as distribution lists for sending electronic mail, and connections to classes of services. This allows the GetAccoutRights API and access rights database 152 to be used to control access to entities that do not correspond to respective nodes of the Directory Service. These non-Directory-Service security tokens are not stored as node properties, but rather are stored by the entities (such as the Mail servers 120 and Gateways 140) with which they are associated.

As a result of the grouping of the content objects, a user's privilege level (or privilege levels) will be the same for all content objects within a given content category. For example, if a given user has the privilege level of "observer" with respect to one content object in the Internet 18-and-older content category, that user will also have the privilege level of observer with respect to all other content objects of the Internet Public content category.

Although the categories listed in FIG. 4B are content based, other bases for categorizing the data entities to which access is controlled are possible. For example, in embodiments of the invention that involve the control of accesses to software resources, the data entities may be grouped according to resource types, with categories such as "user-level threads," "system-level threads," "executable files," and "semaphores."

With further reference to FIG. 4B, the content categories corresponding to tokens 1–4 are a basic set of groups which may be used with an initial implementation of the network 100. As the content of the network grows, these content categories may be subdivided into sub-categories, to thereby achieve a higher degree of access rights granularity with respect to different types of content objects.

The content categories corresponding to tokens 100 and 101 are examples of content categories which may be defined to provide privacy over certain types of data. The content category "Corporation X Beta Test Data," for example, may contain all BBS objects (e.g., folders and messages) which pertain to the beta test of a software product of Corporation X. Access to such a group could be limited to individuals who are participating in the beta test, plus certain employees of Corporation X. This would allow Corporation X to privately correspond with beta test participants, without other users being able to view such correspondence. The content category "Family and Friends for Brown Family" may similarly be formed to allow private correspondence between a small group of subscribers (e.g., Brown family members plus designated friends), and may contain, for example, Chat and BBS objects which have been designated for this purpose. Of course, many different family and friends content categories can be defined to permit private correspondence between many different sub-groups of users.

As indicated above, the 32-bit security tokens are preferably stored by the Directory Service as properties of nodes (in addition to certain tokens that have been defined for controlling access to non-Directory-Service entities). With reference to FIGS. 2 and 4B, for example, nodes 6, 7 and 8 could each have the security token of 0002H stored as a property, indicating that the three corresponding content objects are classified as "Internal 18-and-older" data for security purposes. As described in the following sections, the storage of the security tokens as node properties permits the Directory Service to rapidly and efficiently determine the rights of a user at a particular node. In other embodiments of the invention, the security tokens may be stored elsewhere within the system. For example, each on-line service could store or cache the security tokens for its own content objects.

In the preferred implementation of the network, security tokens are defined by system administrators as needed, and are entered as properties of nodes (typically only by users with at least sysop-level privileges with respect to such nodes) using the Sysop Tools client application. When, for example, a new service is created on the network, the new service can either be assigned its own security token (to allow separate security for the area), or can use an existing security token, such as the security token of the new service's parent node.

6. Compression by Grouping of Users (FIGS. 5A and 5B)

In the preferred embodiment of the on-line services network 100, large numbers of users will typically have the same or similar access rights with respect to many of the content objects. Thus, the number of rows of the access control matrix 300' can be significantly reduced by assigning users that have like access rights to user groups, and by storing the access rights of the user groups in place of user-specific access rights. In the preferred implementation of the network 100, this technique reduces the number of rows by several orders of magnitude.

FIG. 5A illustrates the access control matrix of FIG. 4A following the assignment of users to user groups, and FIG. 5B illustrates a preferred basic set of user groups. Each user group is identifiable by a mnemonic name ("everyone,"

"allsysops," etc.), but is represented internally by a 16-bit group ID. Each user group represents a group of users (i.e., user accounts). The following is a brief description of the basic user groups listed in FIG. 5B.

Everyone. All user accounts.

AllSysops. All users that have sysop privileges with respect to at least one content category. Members of this group can use the Sysop Tools client application to edit the Directory Service structure (FIG. 2), although the specific capabilities of users to edit the structure will normally vary from user to user.

SuperSysops. A small group of system administrators that have generally unlimited accesses rights. Supersysops can, for example, define new user groups and new security tokens.

Guest. User accounts that are used for demonstrations and marketing purposes.

Registration/signup. Accounts that are limited to registration and signup privileges.

18-and-older. Accounts which have access to 18-and-older-only type content objects.

Other groups may include, for example "Company X Beta Test Users," "Company Y Employees," etc.

Associated with each user group is a corresponding set of access rights, which are specified by a respective group-specific row 502 of the access control matrix 300". The access rights for group 1 (i.e., the group "everyone," which has a group ID of 1), for example, are represented by the access rights values in the first row of the matrix 300". The total number of user groups (and thus the number of group-specific rows 502) will typically be very small in comparison to the total number of users. For example, in a network with millions of users, the number of user groups may be as few as several hundred.

Every user account (and thus every user) is assigned to at least one, and possibly multiple user groups. When a user is a member of multiple user groups, the user has all of the access rights associated with both such groups. For example, if a user is a member of both the "everyone" group and the "allsysops" group, the user will have all of the access rights associated with the everyone group plus all of the rights associated with the all sysop group.

In the preferred embodiment, user groups are defined by system administrators based on need. Membership within each group is controlled by updating a group-member table 602 which is stored on the security servers 150. The group member-table 602 contains the user group IDs and corresponding user account numbers for every user group that has been defined. Updates to the group-member table 602 can be made by system administrators using a database editing program. Updates to this table can also be made automatically in response to certain user actions. For example, a service which provides an on-line subscription feature may be configured to automatically update the group-member table 602 whenever a user subscribes to the service, to thereby add the user to a corresponding user group. The group-member table 602 is further described below under the heading ACCESS RIGHTS DATABASE.

With reference to FIG. 5A, in addition to the rows 502 that specify the access rights of the various user groups, the compressed access control matrix 300" includes account-specific rows 504. Each account-specific row specifies rights that are to be "added on" to the group-based rights of the corresponding user. For example, if user A (FIG. 5A) is a member of user groups 1 and 2 only, the access rights of user A will be the rights of group 1, plus the rights of group 2, plus the rights specified in the account-specific row for user A. When the rights of a given user to a given content category are specified in multiple rows of the compressed access control matrix 300", the associated access rights values (XXXX) are logically ORed together to produce a summation of the row-specific rights. By way of example, suppose that user A has certain access rights with respect to content category 1 (i.e., the content category corresponding to token 1) by virtue of being in user groups 1 and 2, and that user A has also been given special rights (such as sysop privileges) with respect to content category 1 that are specified in the account-specific row for user A. To generate a 16-bit access rights value for user A with respect to content category 1, the three 16-bit access rights values (group 1, token 1), (group 2, token 1), and (user A, token 1) are logically ORed together. Numerical examples of this process are provided below.

As indicated by the foregoing, the account-specific rows are used to give certain users "special" access privileges beyond the "general" or "group-based" access privileges obtained by virtue of being in one or more user groups. For example, an account-specific row may be added to give a particular user sysop privileges with respect to a certain BBS folder and its contents, or to give the user moderator privileges with respect to a particular Chat conference. Typically, the number of account-specific rows 504 of the compressed access control matrix 300" will be very small in comparison to comparison to the total number of users of the network 100. For example, for a network having millions of users, the number of account-specific rows 504 will typically be in the hundreds.

In the preferred implementation of the access rights database 152, which is described below, further compression of the compressed access control matrix 300" is effectively achieved by storing only the non-zero entries (i.e., access rights values not equal to 0000H) of the matrix.

7. Access Rights Database (FIG. 6)

Figure 6:
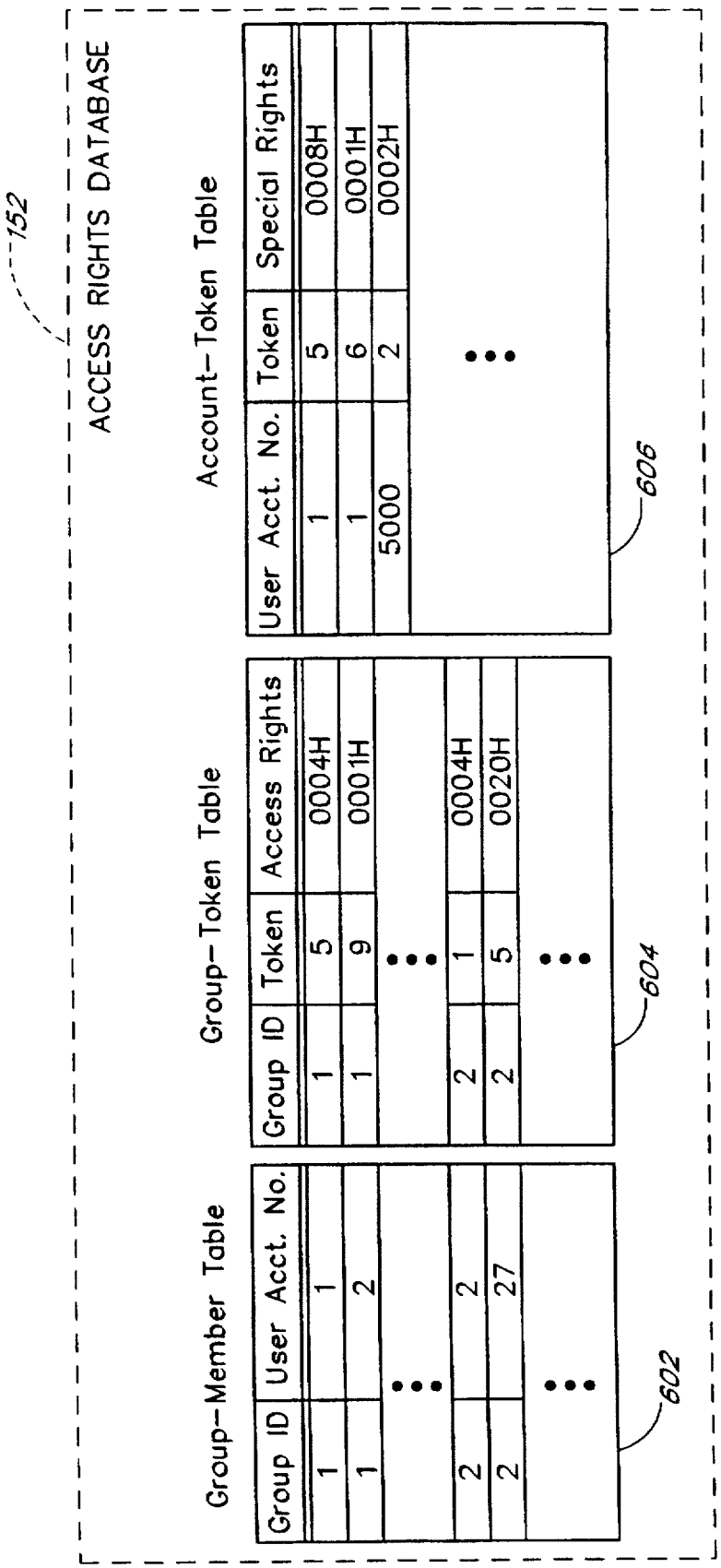
FIG. 6 illustrates a preferred relational database which is used to store access rights data in accordance with the present invention. Numerical values in FIG. 6 are examples of possible table entries.

FIG. 6 illustrates a preferred implementation of the access rights database 152. Generally, the access rights database 152 includes all of the information represented by the compressed access control matrix 300", plus a table 602 that indicates the members (i.e., users) of each user group. As indicated above, the access rights database 152 is preferably stored on each security server 150. In other embodiments, the access rights database 152 may be implemented elsewhere within the network. For example, the access rights database 152 could be implemented on one or more of the application servers 120 and/or Gateways 140. Also, although the access rights database 152 is preferably implemented as a relational database, other database arrangements are possible. For example, a hierarchical database could be used.

In the preferred embodiment, the access rights database 152 is generated and updated directly, without initially generating and/or compressing an access control matrix 300. Stated differently, the above-described horizontal and vertical data compression techniques are inherent features of the preferred database implementation. It is contemplated, however, that these compression techniques can be used to transform an existing access rights database (such as a database of an existing network) into a relational database of the general type shown in FIG. 6.

With reference to FIG. 6, the access rights database 152 includes three tables: a group-member table 602, a group-token table 604, and an account-token table 606. The group-member table 602 specifies the membership of each user group that has been defined, with each row of the table 602 specifying one user group and one user who is a member of the group. User groups are specified in the table 602 by their 16-bit user group IDs, and users (i.e., user accounts) are specified by their 32-bit user account numbers. With reference to the example table entries shown in FIG. 6, user group 1 includes at least users 1 and 2, and user group 2 includes at least users 2 and 27.

The group-token table 604 corresponds to the group-specific rows 502 (FIG. 5A) of the compressed access control matrix 300". Each row of the group-token table 604 specifies one user group, a content category (specified by its 32-bit security token) to which members of the user group have access, and the access rights (in the form of privilege levels) the group's members have with respect to the objects of the content category. By way of example, the first row of the group-token table 604 indicates that members of group 1 have access rights of 0004H (specifying a privilege level of "user," as indicated by FIG. 3B) with respect to all objects within content category 5. The account-token table 606 corresponds to the account-specific rows 504 (FIG. 5A) of the compressed access control matrix 300". Each row of the account-token table 606 specifies one user (i.e., one user account), a content category to which the user has access, and the account-specific access rights the user has with respect to objects within that content category. By way of example, the first row of the account-token table 606 indicates that user 1 has access rights of 0008H (indicating the privilege level of "host") with respect to objects within content category 5. These account-specific access rights are in addition to the group-based rights of 0004H that user 1 has with respect to content category 5. Thus, user 1 will be given both user-level (0004H) and host-level (0008H) access capabilities with respect to all objects within content category 5.

Updates to the tables 602, 604, 606 are preferably made by system administrators using a database editing program which is part of the Sysop Tools client application. As will be appreciated by those skilled in the art, any of a variety of conventional database editing packages may be used for this purpose.

In addition to or in place of the account-token table 606, an exclusion table (representatively shown by the account-token table 606, which is identical in format) may optionally be implemented to take away certain group-based rights of users. The exclusion table has the same format as the account-token table 606, but specifies the access rights that are to be subtracted from (or "masked off") the user's account, with respect to the content category specified therein. For example, an exclusion table row containing the entries (account no.=2), (token=5), (access rights value= 0020H) would indicate that the group-based access rights of 0020H are to be masked off from the account of user 2, leaving user 2 with access rights of only 0004H with respect to content category 5. (Without this exclusion table entry, the rights of user 2 with respect to content category 5 would be 0024H, indicating "sysop" and "user" level privileges.)

The implementation of an exclusion table is useful, for example, for taking away access rights of users who misuse the on-line services. For example, if a particular user consistently uses profanity in BBS messages, the exclusion list could be used to lower that user's BBS access capabilities to a read-only level. The handling of exclusions on an exception basis advantageously permits the benefits of compressing the access rights matrix to be retained.

As will recognized by the foregoing, the inclusion of either an account-token table or an exclusion table will advantageously allow access rights to be customized on a peruser basis.

Figure 7:
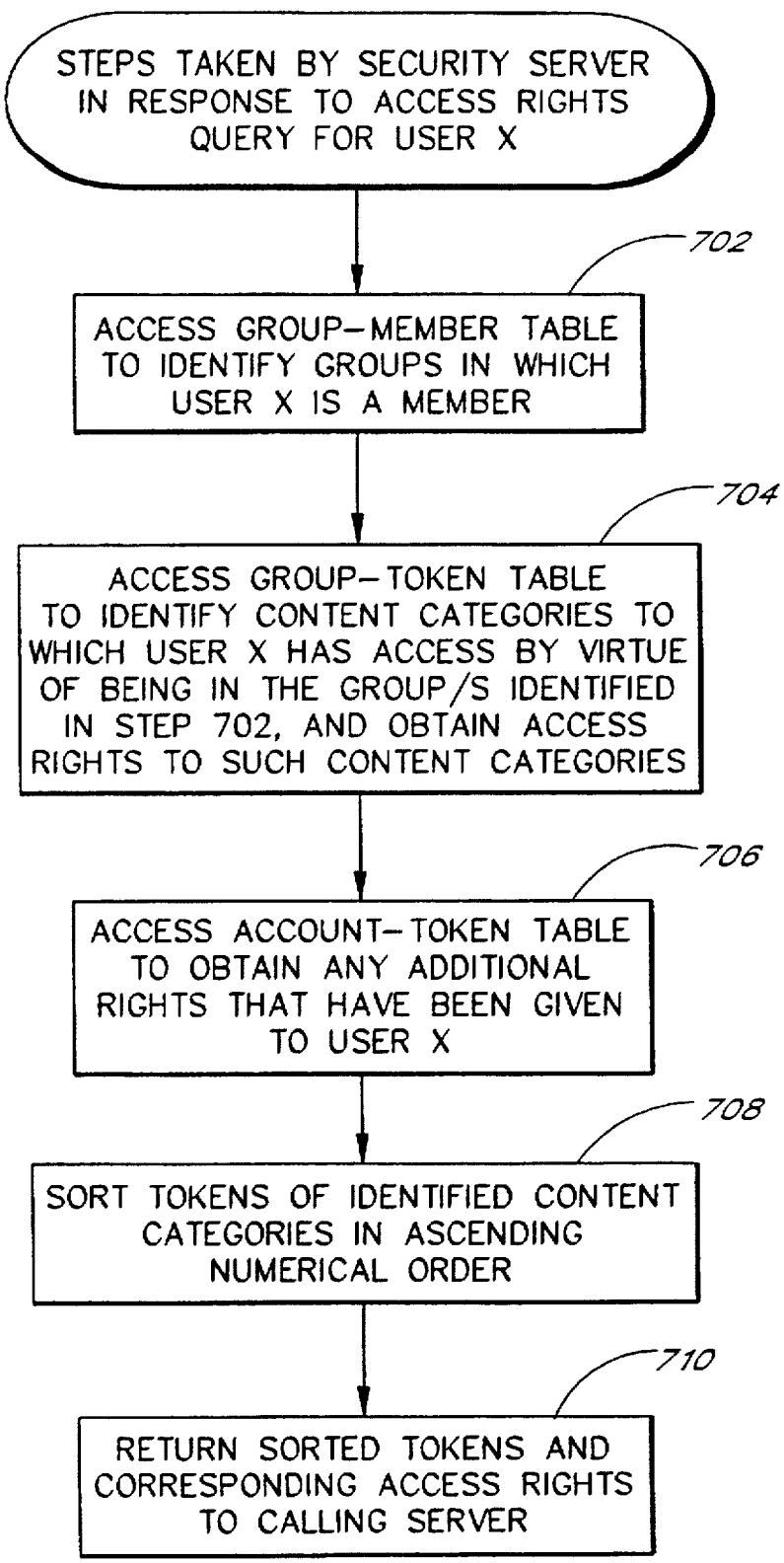
FIG. 7 illustrates a sequence of steps taken by one of the security servers of FIG. 1 when a database query is made for the access rights of a specific user.
Figure 8:
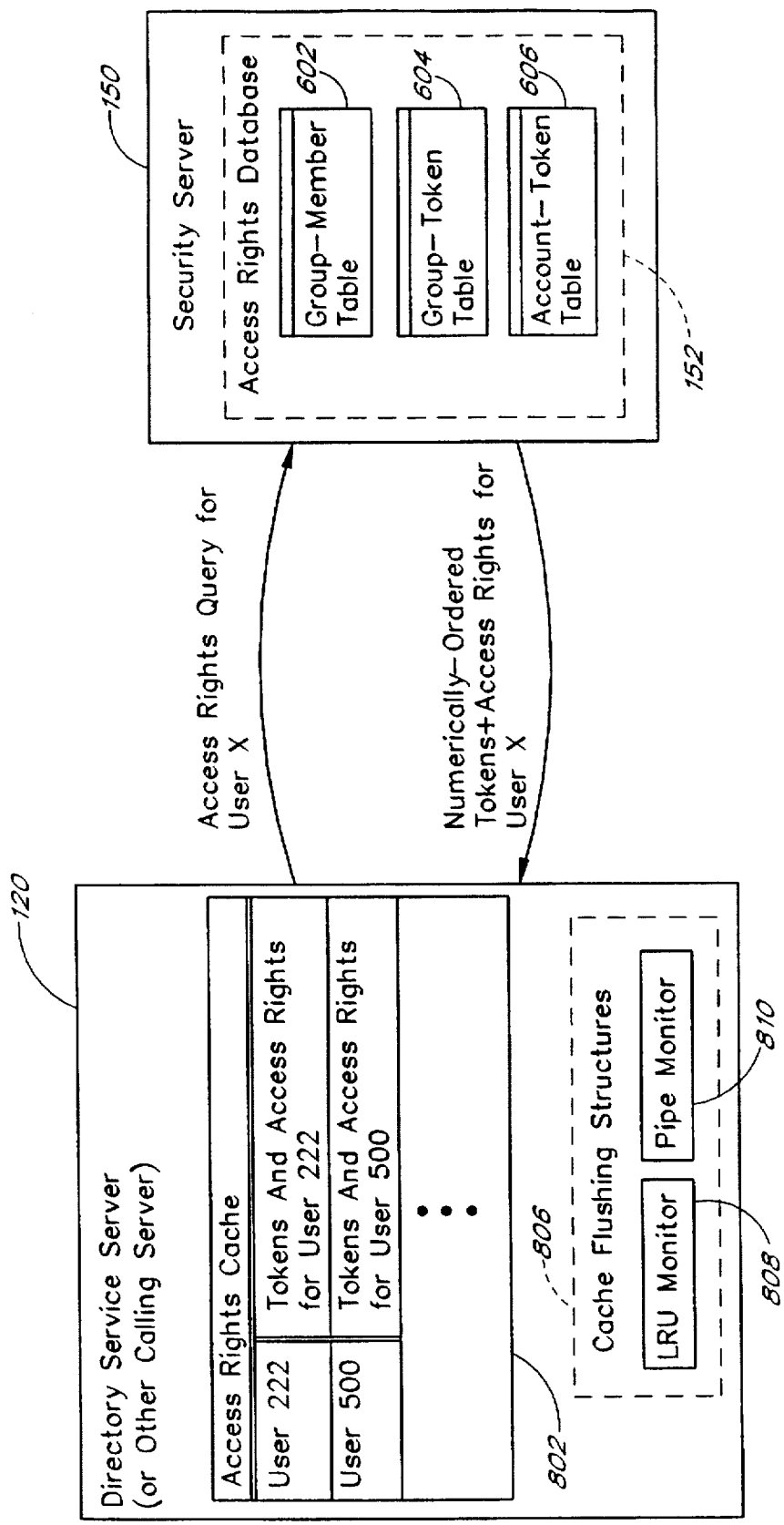
FIG. 8 illustrates the preferred process by which one application server queries a security server for the access rights of a specific user and then caches the access rights data returned by the security server. Also shown in FIG. 8 are the basic structures used for flushing user-specific rows of the cache.

8. queries of Access Rights Database (FIGS. 7 and 8)

In the preferred embodiment, each security server 150 is programmed to receive account-specific access rights queries from the application servers 120 and Gateways 140 within the network, and to respond to each such query by returning all of the access rights data of the user specified in the query. The queries are in the form of remote procedure calls (RPCs) which specify the account number of a single user, and are generated by the calling servers (i.e., the application servers 120 and Gateways 140) using a GetAccountRights API. A round robin approach is preferably used to assign specific queries to specific security servers 150.

To reduce the frequency of queries to security servers 150 (and to avoid the delay associated with such queries), the GetAccountRights API implements a caching scheme wherein the user-specific access rights data returned by the security server 150 is stored within an access rights cache 802 (FIGS. 8 and 9) of the calling server. The GetAccountRights API and associated caching scheme are described below. FIG. 7 illustrates the sequence of steps taken a security server 150 each time a query is received for the access rights of some user (designated as "user X" in FIG. 7). With reference to block 702, the group-member table 602 is initially accessed to identify all of the user groups of which the user is a member. If the subject of the query is user 2 (FIG. 6), for example, this step would identify groups 1 and 2 (and any other groups in which user 2 is a member).

With reference to block 704, once the user groups have been determined, the group-token table 604 is used to identify the content categories (identified by their respective security tokens) to which the user has access, and to obtain the access rights values corresponding to such content categories. If the user has multiple access rights values corresponding to the same token (by virtue of being in multiple user groups), these access rights values are logically ORed together to produce a single 16-bit access rights value, as generally described above. Assuming for purposes of example that the entries shown in FIG. 6 are the only table entries, this step would produce the following results, respectively, for users 1, 2 and 27:

USER 1:
Token 5 rights=0004H
Token 9 rights=0001H
USER 2:
Token 1 Rights=0004H
Token 5 rights=(0004H) OR (0020H)=0024H
Token 9 rights=0001H
User 27:
Token 1 Rights=0004H
Token 5 rights=0020H The result of the step of block 704 is a group-based access rights list, which specifies the access rights (in the form of tokens and corresponding access rights values) the user has by virtue of being a member of one or more user groups. These access rights are referred to herein as the user's "group-based" access rights.

With reference to block 706, once the user's group-based access rights have been obtained from the group-token table 604, the account-token table 606 is accessed to obtain any additional rights that are to be added to the user's group-based rights. For user 1, for example, token 5 rights of 0008H and token 6 rights of 0001H would be obtained. Since user 1 already has group-based rights of 0004H with respect to token 5, the access rights values 0004H and 0008H will eventually be ORed together to produce a single 16-bit value. As described below, this step of ORing the group-based and account-based access rights values is performed, if at all, by the calling server after the query returns.

In embodiments of the access rights database 152 that include an exclusion table, the exclusion table is then accessed to obtain any access rights that are to be taken away from the user's account. This step is similar to the step of accessing the account-token table 606 (since the two tables are identical in format), except that any access rights values read from the exclusion table are applied as masks for masking off the group-based rights specified therein. The step of masking off the user's rights can be performed either before or after the query returns.

The result of the steps 704 and 706 is an access rights list which contains all of the tokens and corresponding access rights values for the user. For user 1, for example, the access rights list would have the following entries (assuming no other table entries exist):

(T5, 0004H), (T9, 0001H), (T5, 0008H), (T6, 0001H).

Each entry in this list is in the form of a 32-bit token (designated by the letter "T") followed by the corresponding 16-bit access rights value. Tokens which do not appear in this list (such as Token 7) represent content categories to which the user has no access rights, and correspond to content objects which will not be shown to the user by the Directory Service. As illustrated for token 5 in this example, an access rights list may have two entries for the same token, since the account-specific access rights values are kept separate from the group-based values.

In other embodiments of the invention, the access rights values may be omitted from the access rights lists, so that each user-specific access rights list consists simply of a string of security tokens (i.e., category identifiers) that identifies the content categories to which the user has access. This may be desirable, for example, in systems that do not require the specification of access rights on a per-object (or on a per-object-category) basis.

With reference to block 708, once the full access rights list for the user has been generated, the security server 150 sorts the tokens in numerically ascending order. For the user 1 access rights list shown above, this step may render the following list:

(T5, 0004H), (T5, 0008H), (T6, 0001H), (T9, 0001H).

With reference to block 710, this list is then returned to the calling server. The calling server stores this user-specific access rights list within its access rights cache 802, and searches this list for specific tokens to determine the access rights of the user with respect to specific content categories. As described below, the step of numerically sorting the tokens facilitates cache searches by the calling server for specific tokens.

FIG. 8 illustrates the process by which a Directory Service server 120 (i.e., a DirSrv or BBS server) queries a security server 150 to determine the access rights of a user, user X, and illustrates the caching scheme used by the Directory Service server 120 to cache access rights data. The query is in the form of an RPC call to the security server 150, specifying the account ID of the user. This query will typically be generated when user X initially opens the Explorer window.

The security server 150 responds to the query by accessing its locally-stored copy of the access rights database 152, and by returning the entire numerically-ordered access rights list for user X. This access rights list specifies the access rights of user X will respect to all nodes of the Directory Service structure. The Directory Service server 120 stores the user's access rights list within a user-specific row of its access rights cache 802. As user X subsequently moves through the Directory Service structure (FIG. 2) to view the various content objects, the Directory Service server 120 checks the cache row corresponding to user X (provided that the row has not been flushed from the cache) for the security tokens of the various nodes of the Directory Service structure. As described above, these security tokens are preferably stored as node properties of the Directory Service structure.

Each check of the cache 802 is initiated by the Directory Service by generating a GetAccountRights call, specifying as parameters of the call the user's account number and a token. The GetAccountRights API either returns the 16-bit access rights value of the user with respect to the token (i.e., with respect to the node which has the token stored as a property), or else returns a code indicating that the user does not have access with respect to the token. If no row exists in the cache 802 for the user, the GetAccountRights API generates a query to a security server 150 to create a cache row for the user, and then checks the cache row for the specified token. If a cache row is already present for the user, no query is necessary, since the information stored in the user's cache row fully specifies the user's access rights with respect to all nodes of the Directory Service structure.

To provide a specific example, suppose that a user double clicks on the icon for node 6 (FIG. 2) of the Directory Service structure (assuming that the Directory Service has already returned the properties of node 6). The Directory Service will respond by reading the security tokens for nodes 7 and 8 (which are stored as properties of these nodes), and by generating two GetAccountRights calls, one for node 7 and one for node 8. The GetAccountRights call for node 7 will result in a check of the user's cache row (and possibly a query to create the cache row) for the token corresponding to node 7, and the GetAccountRights call for node 8 will result in a check of the user's cache row for the token corresponding to node 8. Each GetAccountRights call will return with either a 16-bit access rights value, or, if the security token is not found in the user's access rights list, a code indicating that the user does not have access to the node. If the user does not have access to the node, the Directory Service does not show the node to the user, and the user is prevented from either seeing the node or accessing the corresponding content object continuing the above example, if the user's access rights list (stored in the cache 802) does not contain the security token for node 7, the GetAccountRights API will return a code indicating that the user cannot access node 7. The Directory Service will respond to this code by not sending any node 7 properties to the user's computer 102, so that the node will not be displayed by the Explorer to the user. The user will thereby be prevented from accessing node 7. If, however, the token for node 7 is found in the user's cache row, the GetAccountRights API will read the corresponding 16-bit access rights value from the cache 802, and will return this value to the Directory Service. The Directory Service will then return the properties of node 7 that were requested by the Explorer (as parameters of a GetChildren call, as described above), and the Explorer will display node 7 to the user. The Directory Service and/or Explorer may additionally perform certain actions based upon which of the privilege level bits are set in the 16-bit access rights value. For example, if the "sysop manager" privilege level bit (bit 4 in FIG. 3B) is set, the Directory Service will inform the Explorer (upon request from the Explorer) that the user has sysop manager privileges at node 7, and the Explorer will display a Sysop Tools edit menu that allows the user to edit the properties of node 7. The GetAccountRights API is described in further detail below.

During a typical logon session, the Directory Service will request the user's access rights to hundreds of different content objects, and will thus generate hundreds of GetAccountRights calls. As described below, only the first GetAccountRights call for the user will result in a query to a security server 150, and all subsequent GetAccountRights calls will normally result in a check of the user's row in the cache 802 without a new database query. Because accesses to the local access rights cache 802 are typically much faster than queries of the network-wide access rights database 152, the use of the access rights cache 802 significantly increases the performance of the GetAccountRights API, and thereby allows the user to rapidly move from node to node of the Directory Service structure. The storage of the security tokens as Directory Service node properties provides for a high degree of performance of the Directory Service, which is the service which typically generates the most GetAccountsRights calls.

Although the description thus far has focussed on the use of the GetAccountRights API by the Directory Service, as noted above, other services and machines on the network 100 can also preferably use the API to determine the rights of users. For example, Chat servers 120 may generate GetAccountRights calls as a user moves from Chat object to Chat object within the Chat service. The process by which a non-Directory-Service machine determines the access rights of a user to an object is generally the same as shown in FIG. 8 and described above.

Further, although the foregoing description has focussed on the security tokens that are stored as properties of Directory Service nodes, as indicated above, security tokens may also be stored by other types of entities, so that security can be provided via the GetAccountRights API without creating a corresponding Directory Service node. In the preferred embodiment, for example, the Mail servers store security tokens in association with mail distribution lists, and use these tokens (and the GetAccountRights API) to determine whether individual users are authorized send mail via such distribution lists. Also, the Gateways 140 store security tokens which correspond to various classes of services, including a class of generally-available services, a class of public services that are made available to the general public (e.g., non-subscribers), and a class of toll free services. Whenever a user requests to connect to a service, the corresponding Gateway 140 calls GetAccountRights (using the token of the corresponding class), and opens a pipe to the service only if the user is authorized to access the service.

In the course of a typical logon session, a user may connect to many different application servers 120 and services, and may access many different content objects within each service. Thus, the access rights list of the user will typically be cached on multiple different machines 120, 140 within the network at the same time.

In the preferred embodiment, if an update is made to a user's access rights (via an update to the relational database 152) while the user's access rights list is cached on a machine 120, 140, the cached access rights list will continue to be used, even though it is no longer up-to-date. Thus, an update to the user's access rights will not take effect until the next time the user's access rights list is read from the database 152. In other embodiments, a mechanism may be provided for invalidating all cached copies of a user's access rights list upon the occurrence of certain events, such as upon the generation of an exclusion table entry for the user.

9. Access Rights Cache (FIG. 9)

Figure 9:
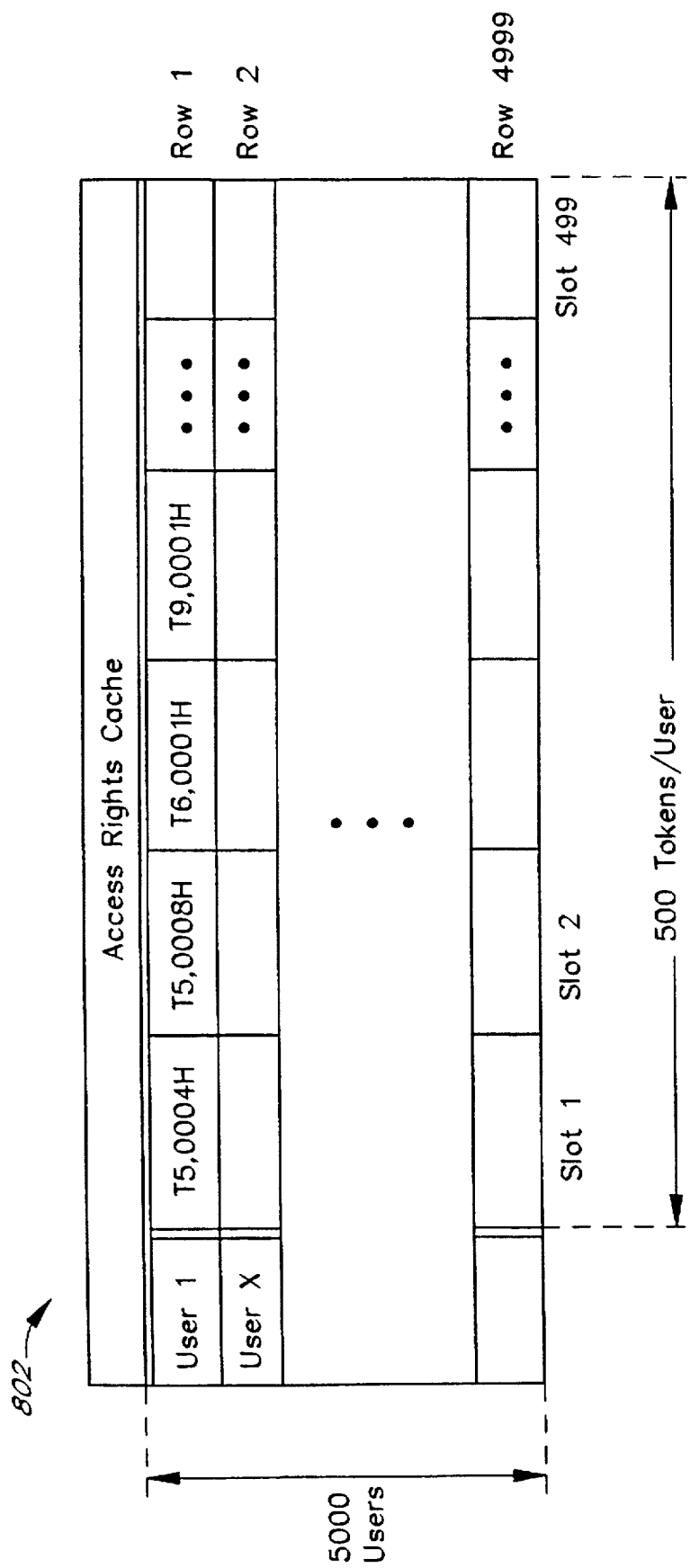
FIG. 9 illustrates a preferred arrangement of the cache of FIG. 8. Numerical values in FIG. 9 correspond to the example table entries of FIG. 6.

FIG. 9 illustrates a preferred implementation of the access rights cache 802, as implemented on the application servers 120 which place GetAccountRights calls. The cache 802 contains 5000 rows, and can thus hold the access rights lists of 5000 different users. Because the number of user-specific service sessions handled by a given application server 120 normally will not exceed 5000, the cache 802 is large enough to hold all of the access rights information of all users who are being serviced by the application server 120. For the Gateways 140, an access rights cache of 1000 rows is used, since each Gateway can handle a maximum of 1000 simultaneous user connections. In other embodiments, the number of cache rows per machine 120, 140 may be allocated dynamically, with the maximum number of cache rows per machine depending upon the amount of memory available on each respective machine.

Each row of the cache 802 contains 500 slots. Each slot stores a 32-bit security token and the corresponding 16-bit access rights value. Each user-specific row can thus store an access rights list having a length of up to 500 tokens, which is sufficient to fully specify the access rights of the user with respect to all nodes of the Directory Service Tree. (Because many nodes will typically have the same security token, the number of nodes to which the user has access may greatly exceed 500.)

The cache 802 is preferably implemented in the dynamic RAM of each machine 120, 140 that places GetAccountRights calls. As described above, multiple machines 120, 140 may simultaneously cache the access rights data of the same user. For example, the user's access rights list may simultaneously be stored in the respective caches 802 of a DirSrv server 120 to which the user is connected, a Chat server to which the user is connected, and the Gateway 140 that is handling the user logon session.

In the preferred embodiment, only a single access rights cache 802 is implemented on any given machine 120, 140 at a time, even if the machine is allocated to multiple service groups. Thus, for example, if two different service applications (such as the Chat and DirSrv applications) are concurrently running on the same application server 120 and both generate GetAccountRights calls, these two service applications will share the same access rights cache 802.

With further reference to FIG. 8, each machine which implements an access rights cache 802 contains cache flushing structures 806 which monitor certain activities to determine when a user-specific access rights list may be overwritten in the cache 802. The first such structure is a least-recently-used (LRU) monitor 808 which monitors accesses to the cache rows to keep track of which row was least recently accessed. The LRU monitor 808 specifies, when the cache 802 is full (i.e., all rows occupied), the cache row that is to be overwritten when a new access rights list is returned by a security server 150. Least-recently-used algorithms are well known in the art.

The second cache flushing structure is a pipe monitor 810 which monitors the number of pipes that each user has to the application of the application server 120 (or Gateway 140) on which the cache 802 resides. Whenever the pipe monitor 810 detects that the number of pipes for a given user has gone to zero (indicating that the user has disconnected from the server 120), the user's access rights list is deleted from the cache 802.

When a cache row is created for a user, the slots of the user's cache row are filled in sequential order (from the lowest slot number to the highest slot number) as the numerically-ordered access rights list is returned by the security server 150. As illustrated in FIG. 9 for the example access rights list of user 1, the tokens (and corresponding access rights values) are written to the cache 802 in numerically ascending order. As illustrated by slots 1 and 2 for user 1, duplicate tokens may be present in the list, indicating that the user has been given additional rights via the account token table 606. These duplicate tokens will always fall in adjacent cache slots.

To obtain the access rights of the user with respect to a given content category, the GetAccountRights API performs a binary search of user's cache row for the token specified as a parameter of the API. If the token is found, the corresponding access rights value (stored in the same cache slot as the token) is read from the cache 802. The GetAccountRights API also checks the adjacent slot or slots for duplicate tokens. If a duplicate token is found, the corresponding access rights value is read and logically ORed with the first access rights value to generate a single 16-bit access rights value. By way of example, the call GetAccountRights (user 1, token 5) would cause the access rights values 0004H and 0008H to be read from the first two slots of the cache row for user 1, and these two values would be ORed to produce 000CH.

Advantageously, the GetAccountRights API is structured to begin the binary search even if the cache row is currently being filled, allowing the API to return before the entire access rights list has been returned by the security server 150. Using the access rights list for user 1 (FIG. 9) as an example, if the search is for token 6, and the cache row is currently being filled, it is possible (and likely) that token 6 will be found before the cache row for user 1 is complete. This feature of the GetAccountRights API increases performance on GetAccountRights calls which require a query of the access rights database 152. To take full advantage of this feature, care is taken by system administrators to assign the lowest numbered tokens to the most commonly accessed object groups (since the lowest numbered tokens are the first to be returned by the security server 150, and the first to be written to the cache). This feature of the GetAccountRights API is further described below.

10. GetAccountRights Method (FIG. 10)

Figure 10:
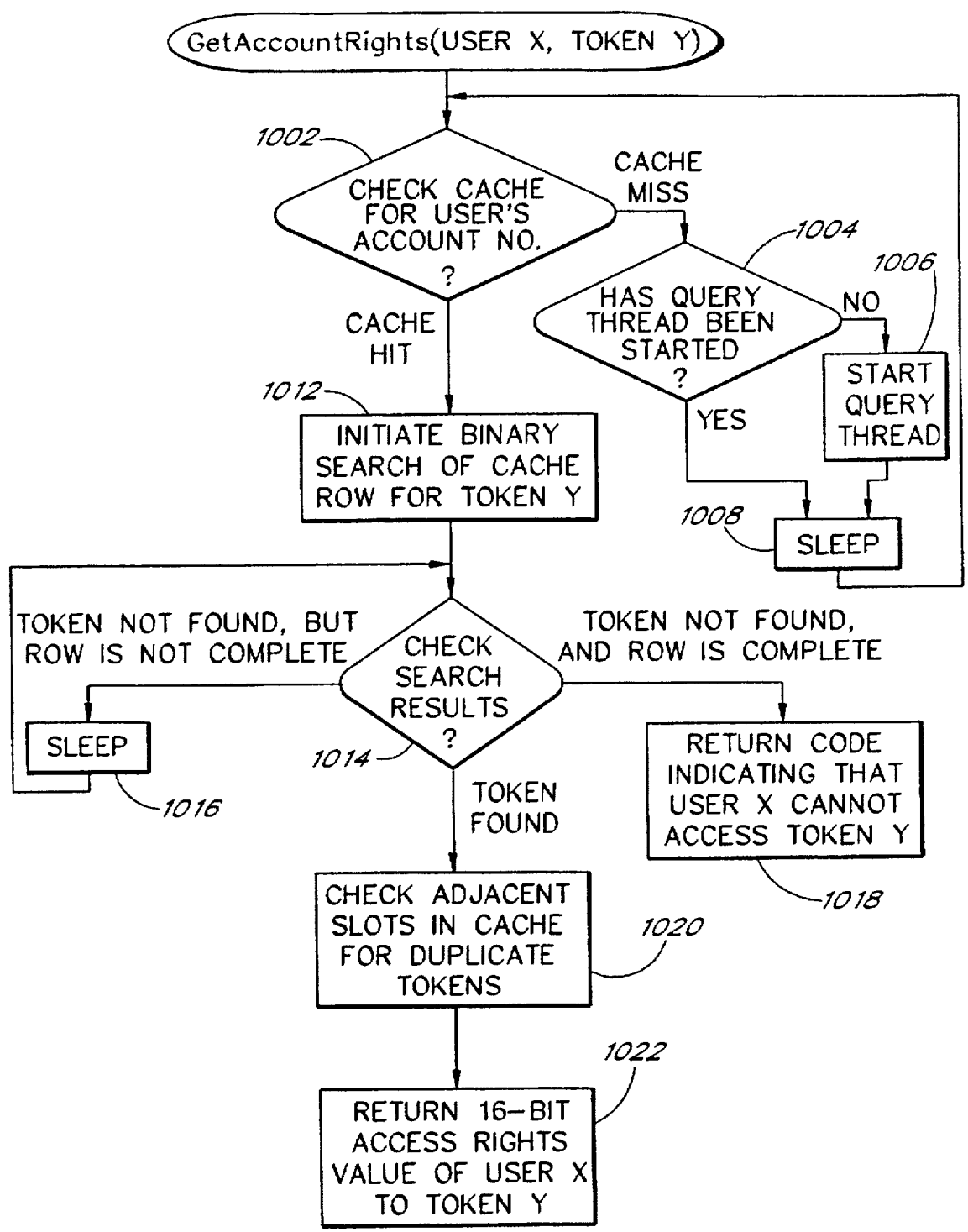
FIG. 10 illustrates a sequence of steps taken by an application server to determine the access rights of a specific user ("user X") with respect to a specific token ("token Y").

FIG. 10 illustrates the sequence of steps corresponding to the GetAccountRights API. These steps are performed by the application server 120 (or Gateway 140) that generates the GetAccountRights call. As described above, the GetAccountRights API is called whenever it becomes necessary to determine the rights of a user with respect to a content object. The parameters of the GetAccountRights API are the 32-bit account number of the user (designated as "user X" in FIG. 10) and the 32-bit token (designated a "token Y") of the node.

With reference to decisional block 1002, the calling server 120 initially checks its access rights cache 802 to determine whether a cache row exists for user X. This is preferably accomplished using a conventional hash algorithm to search for the user's account number.

With reference to blocks 1004–1008, if no cache row exists for user X, the server determines whether a query thread has been started to obtain the access rights of user X from the access rights database 152. If a query thread has been started, the API sleeps for an appropriate interval (to allow a cache row to be created for user X), and then rechecks the cache 802. If no query thread has been started, the API starts a query thread before sleeping and rechecking the cache 802. The use of a separate query thread for creating and filling the user's cache row advantageously facilitates the concurrent filling of a cache row and searching of the cache row.

With reference to block 1012, once a cache row has been created for user X (which may or may not be complete), a binary search is initiated for token Y. With reference to blocks 1014–1018, as the binary search progresses, the API tests the results of the search and takes one of three actions. If the token is not found but the cache row is not yet complete (indicating that the access rights list is still being returned), the API sleeps and then retests the search results. If the token is not found and the user's cache row is complete, the API returns a code indicating that the user does not have any access rights with respect to the token.

With reference to blocks 1020–1022, if token Y is found, the corresponding 16-bit access rights value is read from the cache. The API then checks the adjacent slot or slots in the cache for token Y. If a duplicate of token Y is found (indicating that user X has been given additional access rights with respect to token Y via the account-token table 606), the corresponding access rights value is read from the cache and logically ORed with the first access rights value. The result of the logical OR operation is then returned.

11. Assignment of Tokens and Formation of User Groups

In the preferred embodiment of the network 100, new security tokens are assigned by system administrators (to create new content categories) as it becomes necessary or desirable to provide separate security with respect to new or existing service areas. In accordance with one preferred mode of operation, security tokens are assigned so as to create service areas that are managed or "owned" by different individuals. The responsibility of monitoring and/or otherwise managing the content of the network is thereby be distributed among many (e.g., 500) different users, including system administrators, subscribers, and third party content providers.

To provide a specific example of how ownership may be assigned to service areas in accordance with the present invention, suppose that a system administrator wants to create a new service area, such as a bulletin board on a particular topic, and wishes to designate a particular subscriber as the owner of the new service area. (In the preferred embodiment of the network 100, subscribers can request the creation of certain types of service areas, and can volunteer to be owners of such areas.) To generate the new BBS service area, the system administrator creates a BBS folder node (preferably using the Sysop Tools client application) in the Directory Service tree. To provide separate security for this new service area, the system administrator assigns a unique security token to the folder node, and enters this security token as a property of the folder node. (BBS messages subsequently created under the new BBS folder then inherit this security token, and become part of the same content category.) To give the user ownership-type privileges to the new service area, the system administrator then generates a user-specific row in the account-token table 606, specifying (1) the user's account number, (2) the newly-created security token, and (3) an access rights value that has the "sysop manager" bit (bit 4 in FIG. 3B) set. Finally, the system administrator adds one or more rows to the group token-table 604, specifying in each such row: (1) the group ID of a user group which will be given access to the new service area, (2) the newly-created security token for the area, and (3) an access rights value that specifies the privilege level/s members of the group are to have with respect to the new service area. For example a row could be created to give members of group 1 (the group "everyone") user-level access to the new area.

In accordance with another preferred mode of operation, content categories and associated user groups are formed so as to create many different "private" service areas (such as the "family and friends" type service areas described above) that are accessible to different subgroups of users. To provide a specific example, suppose that a system administrator wants to create a Chat room to allow members of a certain organization to carry on an interactive conversation. To create such a Chat room, the system administrator initially creates a Chat room node, specifying a unique security token for the Chat room. The system administrator then updates the group-member table 602 so as to create a new group that consists of the accounts of the members of the organization. (If the group is small, the system administrator may forego creating a new user group, and may alternatively generate one user-specific row in the account-token table 606 for each member of the organization.) Finally, the system administrator adds a row to the group-token table 604, specifying (1) the group ID of the newly-created user group. (2) the security token of the Chat room, and (3) an appropriate access rights value.

As will be recognized from the foregoing, content categories and user groups may be formed by system administrators to achieve any of a variety of different security-related objectives. These objectives will depend generally upon the nature of the particular network in which the present invention is employed, and will depend upon the type or types of data entities to which access is being controlled.

As will be apparent to those skilled in the art, the general criteria used by system administrators for deciding when to create new user groups and when to assign new security tokens will ultimately affect the quantity of data stored within the access rights database 152. In the network 100 described herein, these decisions may advantageously be made as folder nodes are added to the Directory Service structure. The decision making process may be assisted or the decision may be made by a computer software system which monitors the contents of the access rights database 152, and which recommends modifications that can be made to the existing user groups and content categories in order to reduce the quantity of data stored within the database 152.

12. Other Embodiments

As described above, the preferred embodiment uses Directory Service nodes as the basic content unit with which different security levels may be associated. Thus, in order to provide security for a content object, a corresponding node (with a corresponding security token stored as a property) must be created in the Directory Service structure. As will be readily apparent to those skilled in the art, however, various alternatives to the node-based approach are possible. For example, the security tokens could be stored or cached with the content objects, or could be stored within tables maintained by the various services (such as Chat or Mediaview). (Accordingly, it will further be recognized that the present invention does not require the use of a directory structure). Hybrid approaches are also possible, in which the security tokens for some content objects (such as folder-type objects) are stored within a directory structure, while the security tokens for other content objects are stored elsewhere within the system.

It will also be appreciated that although the preferred embodiment described herein is directed to the security of user-accessible content objects in an on-line services network, other embodiments may be directed to the security of entirely different types objects and data entities. For example, the invention may readily be adapted to control user accesses to files in a file system, or to control accesses by software processes to system resources.

In view of these variations and other variations which may be apparent to those skilled in the art, the scope of the present invention is intended to be defined only by reference to the appended claims.

What is claimed is:

1. A method for controlling user access to a plurality of data entities in a computer network, said plurality of data entities stored on a plurality of application servers, said method comprising the steps of:
   sending an access rights query from an application server to a security server, said access rights query specifying a user of the network;
   at said security server, accessing a relational database in response to said access rights query to obtain an access rights list for said user, said access rights list specifying access rights of said user with respect to said plurality of data entities;
   sending said access rights list from said security server to said application server;
   at said application server, storing said access rights list in an access rights cache; and
   accessing said cache to determine the access rights of said user with respect to a specific data entity of said plurality of data entities.

2. The method according to claim 1, wherein said access rights list comprises a plurality of category identifiers, each of said category identifiers specifying a data entity category.

3. The method according to claim 2, wherein said access rights list further comprises a plurality of access rights values, each of said access rights values corresponding to a respective one of said category identifiers and specifying access rights of said user with respect to data entities that fall within a respective data entity category.

4. The method according to claim 2, further comprising the step of determining a data entity category in which said specific data entity falls.

5. The method according to claim 4, wherein said step of determining a data entity category comprises accessing a directory structure which is stored on at least one of said plurality of application servers, said directory structure representing an arrangement of said plurality of data entities.

6. The method according to claim 4, wherein said step of determining a data entity category comprises reading a category identifier stored with said specific data entity.

7. The method according to claim 4, wherein said step of determining a data entity category comprises reading a category identifier that is stored on an application server in association with said specific data entity.

8. The method according to claim 2 wherein said step of accessing said cache comprises searching said cache for a specific category identifier, said specific category identifier representing a data entity category in which said specific data entity falls.

9. The method according to claim 2, wherein said step of storing said access rights list in said cache comprises storing said category identifiers in a numerical order within said cache to thereby facilitate searches of said cache.

10. The method according to claim 1, wherein said access rights list comprises a plurality of access rights values, said access rights values specifying generic privilege levels of said user.

11. The method according to claim 10, wherein said step of accessing said cache comprises the steps of reading an access rights value from said cache, and translating said access rights value into a set of specific access capabilities.

12. The method according to claim 11, wherein said step of translating is performed by a service application running on said application server, said service application being associated with said specific data entity.

13. The method according to claim 1, wherein said step of accessing said relational database comprises identifying at least one user group in which said user is a member.

14. The method according to claim 13, wherein said step of accessing said relational database further comprises identifying a plurality of data entity groups to which said user has access rights by virtue of being a member of said at least one user group.

15. The method according to claim 1, wherein said step of storing said access rights list in said cache and said step of accessing said cache to determine the access rights of said user are performed concurrently.

16. The method according to claim 1, wherein said plurality of data entities represents the content of an on-line services network.

17. The method according to claim 1, wherein at least one of said plurality of data entities is a system resource.

18. The method according to claim 1, further comprising the step of forwarding said access rights list from said application server to a different application server when said user connects to said different application server.

19. The method according to claim 1, further comprising the step of, if said user is not authorized to access said specific data entity, preventing said user from seeing a representation of said specific data entity.

20. The method according to claim 19, wherein said step of preventing comprises omitting said representation from a reconstructed directory structure that is shown to said user.

21. A method of determining the access rights of a user of a computer system with respect to a plurality of data entities of the computer system, comprising the steps of:

identifying at least one user group of which said user is a member, said at least one user group being part of a predefined set of user groups; and identifying at least one data entity category to which said user has access by virtue of being a member of said at least one user group, said at least one data entity category being part of a predefined set of data entity categories.

22. The method according to claim 21, wherein said steps of identifying at least one user group and identifying at least one data entity category each comprise accessing a relational database stored on a server of a computer network.

23. The method according to claim 21, further comprising the step of identifying at least one data entity that falls within said at least one data entity category.

24. The method according to claim 21, further comprising the steps of:

determining a specific data entity category in which a specific data entity falls; and determining whether said at least one data entity category to which said user has access includes said specific data entity category, to thereby determine whether said user has access to said specific data entity.

25. The method according to claim 21, further comprising the step of reading an access rights value that specifies access rights of said user with respect to all data entities that fall within a data entity category of said at least one data entity category.

26. The method according to claim 21, further comprising the step of identifying at least one additional data entity category to which said user has access, said at least one additional data entity category being in addition to data entity categories to which said user has access by virtue of being a member of user group.

27. The method according to claim 21, wherein said step of identifying at least one user group of which said user is a member comprises identifying a plurality of user groups of which said user is a member.

28. The method according to claim 21, wherein each user group of said predefined set of user groups corresponds to a respective set of user access rights with respect to said plurality of data entities.

29. The method according to claim 21, wherein each data entity category of said predefined set of data entity categories contains a respective subgroup of said plurality of data entities.

30. The method according to claim 21, wherein each data entity of said plurality of data entities falls within exactly one data entity category of said predefined set of data entity categories.

31. The method according to claim 21, further comprising the steps of:

generating a list of category identifiers that identifies said at least one data entity category to which said user has access; and transmitting said list across a computer network to at least one server.

32. The method according to claim 31, further comprising the step of storing said list in a cache memory of said at least one server.

33. The method according to claim 31, further comprising the step of storing said list in respective cache memories of a plurality of servers.

34. The method according to claim 21, wherein said plurality of data entities represents a content of an on-line services network.

35. The method according to claim 21, wherein said plurality of data entities comprises files of a file system.

36. The method according to claim 21, wherein said plurality of data entities comprises system resources to which access is controlled by an operating system.

37. In a computer network in which different users have different access rights with respect to different data entities, a method of efficiently specifying the access rights of users, comprising the steps of:

assigning each of a plurality of data entities to one of a plurality of categorical groups of data entities, each of said categorical groups containing data entities for which user access rights may be specified collectively; and assigning each of a plurality of users to at least one of a plurality of user groups, each of said user groups having a corresponding set of access rights associated therewith with respect to said plurality of categorical groups.

38. The method according to claim 37, wherein said step of assigning each of said plurality of data entities to one of said plurality of categorical groups comprises storing a respective categorical group identifier in association with each of said plurality of data entities.

39. The method according to claim 38, wherein said step of storing comprises storing a categorical group identifier within a data entity directory structure.

40. The method according to claim 37, wherein said step of assigning each of said plurality of users to at least one of said plurality of user groups comprises assigning at least one of said users to multiple of said user groups.

41. The method according to claim 37, wherein each of said data entities is a content object that represents content of an on-line services network.

42. A system for providing user access to data entities in a computer network, comprising:

at least one application server that stores a plurality of data entities, said data entities accessible by a plurality of users through a plurality of application programs, different of said users having different levels of access with respect to at least some of said data entities;

a database which stores access rights values that specify access rights of said users with respect to said data entities; and an access rights cache on said at least one application server, said access rights cache storing access rights lists, said access rights lists obtained from said database in response to requests from said at least one application server, each of said access rights lists comprising a plurality of said access rights values and specifying access rights for a respective one of said plurality of users.

43. The system according to claim 42, wherein said access rights values are stored in said database in association with category identifiers that identify categories of said data entities.

44. The system according to claim 43, wherein each of said lists further comprises a plurality of said category identifiers.

45. The system according to claim 43, wherein said database is implemented on a separate server from said at least one application server.

46. The system according to claim 45, wherein said at least one application server stores at least a subgroup of said category identifiers.

47. The system according to claim 43, wherein said access rights values are stored in said database in further association with group identifiers that identify groups of said users.

48. The system according to claim 42, wherein said at least one application server runs a program module that generates a query of said database when a user connects to said at least one application server, said query causing an access rights list for said user to be obtained from said database and written to said access rights cache.

49. The system according to claim 48, wherein said program module deletes said access rights list from said cache when said user disconnects from said at least one application server.

50. The system according to claim 42, wherein said access rights cache specifies access rights for a variable subset of said plurality of users.

51. The system according to claim 42, wherein each of said access rights lists specifies user access rights with respect to all of said data entities.

52. The system according to claim 42, wherein said at least one application server comprises an application server that runs a directory service application program, said directory service application program providing a directory of said data entities to said users.

53. The system according to claim 42, wherein said access rights values contain privilege level bits which specify general privilege levels, said general privilege levels converted into specific access capabilities by said application programs, different application programs converting like privilege levels into different access capabilities.

54. An access rights list stored on a storage medium of a computer, said access list specifying the access rights of a user of a network with respect to a plurality of data entities of said network, said plurality of data entities subdivided into multiple categorical groups of data entities, said access rights list comprising:

a plurality of group identifiers, each of said group identifiers specifying one of said multiple categorical groups, said plurality of group identifiers specifying a subset of said multiple categorical groups to which said user has access rights; and a plurality of access rights values, each of said access rights values specifying access rights with respect to data entities which fall within a respective one of said categorical groups of said subset.

55. The access rights list according to claim 54, wherein said group identifiers are arranged in a numerical order to facilitate searches for individual group identifiers.

56. The access rights list according to claim 54, wherein said plurality of data entities represents content of an on-line services network.

57. The access rights list according to claim 54, stored within an access rights cache of a server.

58. The access rights list according to claim 54, stored within an access rights cache of a gateway computer.

59. A relational database for storing access rights data which specifies access rights of users with respect to a plurality of data entities of a computer network, said plurality of data entities subdivided into a plurality of categories, said database comprising:

a first table that maps users to user groups, at least one of said users being a member of multiple of said user groups;

a second table which contains, for each of said user groups, a group-based access rights list that specifies group-based access rights of members of a respective user group, said group-based access rights list stored in association with a plurality of category identifiers that identify said categories of data entities; and a third table which contains, for a least one of said users, a user-specific access rights list that specifies special rights for a respective user, said user-specific access rights list stored in association with said plurality of category identifiers.

60. The relational database according to claim 59, wherein said special rights are additional rights that are added to said group-based rights of said respective user.

61. The relational database according to claim 59, wherein said special rights are exclusion rights that are subtracted from said group-based rights said respective user.

62. The relational database according to claim 59, wherein said data entities are content objects of an on-line services network.

63. In a computer network in which different users have different access rights with respect to different data entities, a method of specifying the access rights of a user with respect to a plurality of data entities, comprising the steps of:

assigning a category identifier to said plurality of data entities;

storing said category identifier with or in association with each data entity of said plurality of data entities; and storing an access rights value in association with said category identifier and in further association with an account number of said user, said access rights value specifying said access rights of said user with respect to said plurality of data entities.

64. The method according to claim 63, wherein said access rights value comprises a plurality of privilege level bits, each of said privilege level bits corresponding to a respective privilege level which may be assigned to said user.

65. The method according to claim 63, wherein said access rights value specifies a sysop privilege level of said user with respect to said plurality of data entities.

66. The method according to claim 63, wherein said step of storing said category identifier comprises storing said category identifier in association with at least one node of a directory structure, said directory structure providing a directory to at least said plurality of data entities.

* * * * *

UNITED STATES PATENT AND TRADEMARK OFFICE
CERTIFICATE OF CORRECTION

PATENT NO.   : 5,941,947
DATED        : August 24, 1999
INVENTOR(S)  : Brown et al.

It is certified that error appears in the above-identified patent and that said Letters Patent is hereby corrected as shown below:

Column 13,
Line 39, "Dirsrv" should read -- DirSrv --.
Line 50, "Depending" should begin a new paragraph.

Column 23,
Line 18, "The" should begin a new paragraph.
Line 67, "peruser" should read -- per-user --.

Column 24,
Line 20, "FIG.7" should begin a new paragraph.

Column 26,
Line 47, "object continuing" should read -- object. Continuing -- with "Continuing" beginning a new paragraph.

Column 30,
Line 32, "thereby be" should read -- thereby --.

Signed and Sealed this

Twenty-third Day of December, 2003

JAMES E. ROGAN
*Director of the United States Patent and Trademark Office*